(12) United States Patent
Marburger

(10) Patent No.: US 10,639,757 B2
(45) Date of Patent: *May 5, 2020

(54) WORKPIECE-ALIGNMENT TOOLS AND TECHNIQUES

(71) Applicant: Jason A. Marburger, Spokane, WA (US)

(72) Inventor: Jason A. Marburger, Spokane, WA (US)

(73) Assignee: Fireball Tool Works, LLC, Santa Fe Springs, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/707,628

(22) Filed: Sep. 18, 2017

(65) Prior Publication Data

US 2018/0141178 A1    May 24, 2018

Related U.S. Application Data

(60) Provisional application No. 62/505,941, filed on May 14, 2017.

(51) Int. Cl.
*B23Q 3/18* (2006.01)
*B23K 37/04* (2006.01)
*B23P 19/04* (2006.01)
*B23Q 3/00* (2006.01)

(52) U.S. Cl.
CPC .......... *B23Q 3/186* (2013.01); *B23K 37/0443* (2013.01); *B23P 19/04* (2013.01); *B23Q 3/005* (2013.01)

(58) Field of Classification Search
CPC ............................ B23Q 3/186; B23K 37/0443

USPC ........................................... 33/645; 228/49.1
See application file for complete search history.

(56) References Cited

U.S. PATENT DOCUMENTS

| 2,108,077 | A | * | 2/1938 | Robinson | ........... B23K 37/0533 |
| | | | | | 219/161 |
| 2,328,040 | A | | 8/1943 | Weightman | |
| 2,371,831 | A | * | 3/1945 | Leming | ................. B23Q 3/104 |
| | | | | | 269/246 |
| 2,835,978 | A | | 5/1958 | Krisel | |

(Continued)

OTHER PUBLICATIONS

"Restriction Requirement", U.S. Appl. No. 15/707,746, dated Jul. 25, 2019, 6 pages.

(Continued)

*Primary Examiner* — Christopher W Fulton
(74) *Attorney, Agent, or Firm* — SBMC

(57) ABSTRACT

Workpiece-alignment tools and techniques are described. Workpiece-alignment tools and techniques are usable to ensure consistent and durable alignment of various workpieces while providing access for performing attachment techniques thereon. In one example, the workpiece-alignment tool includes alignment surfaces that are joined to one another and oriented at corresponding specific angles. The workpiece-alignment tool includes accessibility cutouts and access spaces that provide a user simultaneous access to points around a joint formed by objects aligned with the alignment surfaces. In this way, the workpiece-alignment tool provides accessibility that allows a user to operate upon a workpiece, e.g., as by joining aligned objects together, without interfering or obstructing access to the objects.

20 Claims, 22 Drawing Sheets

(56) References Cited

U.S. PATENT DOCUMENTS

| | | | |
|---|---|---|---|
| 3,824,744 A * | 7/1974 | Petrant | B23Q 3/103 |
| | | | 269/258 |
| 4,805,315 A * | 2/1989 | Nesbitt | B25B 5/145 |
| | | | 248/248 |
| 5,024,002 A | 6/1991 | Possati | |
| 5,653,038 A | 8/1997 | Hunter | |
| 5,855,073 A * | 1/1999 | Boelling | A47B 96/061 |
| | | | 248/235 |
| 6,314,652 B1 * | 11/2001 | English | G01B 5/24 |
| | | | 33/419 |
| 6,453,574 B1 | 9/2002 | Chen | |
| 6,758,016 B2 * | 7/2004 | Gobeil | E04F 11/00 |
| | | | 182/228.3 |
| 7,481,004 B2 | 1/2009 | Krohmer et al. | |
| 2001/0045695 A1 | 11/2001 | Andronica | |
| 2003/0140512 A1 * | 7/2003 | Jevons | B25B 5/142 |
| | | | 33/481 |
| 2007/0221292 A1 * | 9/2007 | Krohmer | B25B 5/102 |
| | | | 144/286.5 |
| 2007/0245581 A1 * | 10/2007 | Hios | B43L 7/10 |
| | | | 33/429 |
| 2009/0090012 A1 * | 4/2009 | Varnedoe | B23K 37/0443 |
| | | | 33/475 |
| 2017/0211919 A1 * | 7/2017 | Babich | G01B 3/563 |
| 2018/0161946 A1 * | 6/2018 | Marburger | B23P 19/04 |

OTHER PUBLICATIONS

"Non-Final Office Action", U.S. Appl. No. 15/707,746, dated Oct. 1, 2019, 9 pages.

"Notice of Allowance", U.S. Appl. No. 15/707,746, dated Jan. 2, 2020, 5 pages.

* cited by examiner

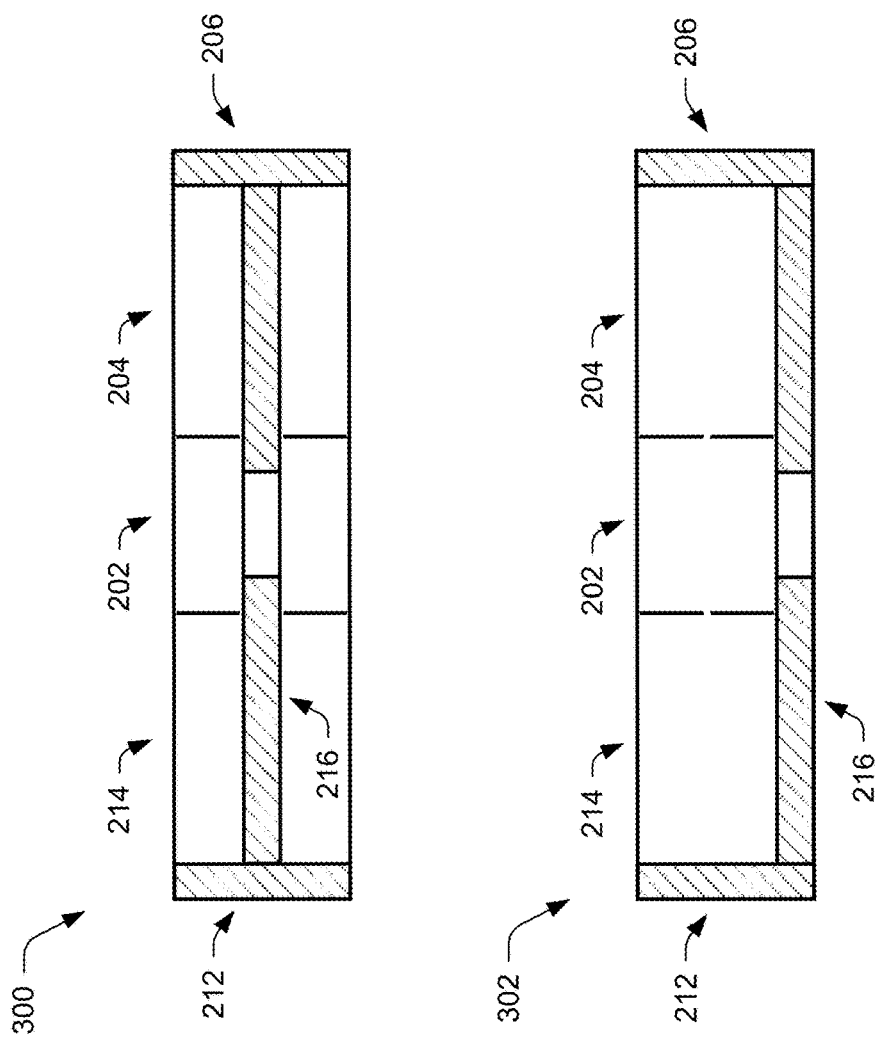
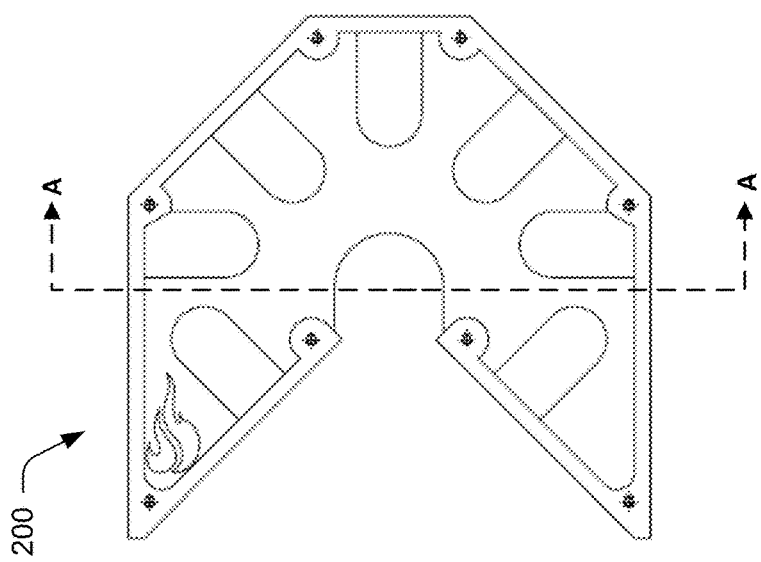
Fig. 3

WORKPIECE-ALIGNMENT TOOLS AND TECHNIQUES

RELATED APPLICATIONS

This application claims priority to U.S. Provisional Application No. 62/505,941, filed May 14, 2017, entitled "Adjustable angle builders square" the disclosure of which is incorporated by reference herein in its entirety.

BACKGROUND

Welders, carpenters, and other people joining workpieces together often have a need to join the workpieces together at particular angles. A welder, for instance, may frequently need to weld two metal workpieces together at specific angles, such as 90-degrees or 45-degrees. However, a single welder cannot simultaneously hold two or more workpieces himself, align the workpieces to a specific angle, and ensure that the alignment does not change during the welding process.

Conventional tools for aligning workpieces, such as carpentry or speed squares, suffer from numerous limitations that reduce or negate their utility. For example, while a speed square may provide a 90-degree angle, a speed square is substantially planar itself and does not provide flat planar edges on which to properly align workpieces. Further, a speed square lacks the ability to hold workpieces, and both the speed square and the workpiece must be manually held to ensure that an alignment does not change. Due to these limitations, a user of a speed square is often subjected to a time-consuming iterative process of aligning two workpieces with the speed square, removing the speed square, attaching the workpieces to one another, realigning the workpieces with the speed square, adjusting the attachment between the workpieces, and so on.

Further, forming an angle with a conventional tool requires direct placement of the tool in a joint forming the angle. For example, a user attempting to join two workpieces to form a 90-degree angle must place a conventional tool at the point of joinder and directly flush with the workpieces. Such a placement of a tool directly obstructs the ability to operate upon a workpiece at the point of joinder. This is particularly troublesome when the operation involves welding, where the welding implements themselves must occupy an amount of space proximate to the workpieces. Additionally, the point of joinder between workpieces does not always correspond to the intersection of the planes to which the workpieces are aligned. For example, two workpieces may be aligned at an angle of 90-degrees with respect to one another, but attached via a third workpiece that forms a chamfered corner. In scenarios such as these where there is not a single point of joinder corresponding to a desired angle, conventional tools utterly fail and cannot accurately align workpieces.

Thus, conventional tools and techniques lack the ability to quickly and accurately align workpieces in various scenarios, lack the ability to ensure that the alignment does not change during an operation upon a workpiece, and obstruct access to the point of joinder of workpieces.

SUMMARY

Workpiece-alignment tools and techniques are described. The tools and techniques are usable to ensure consistent and durable alignment of various workpieces while providing access for performing attachment techniques thereon, which is not possible using conventional tools and techniques.

The workpiece-alignment tool, for instance, may include alignment surfaces that are joined to one another and oriented at corresponding specific angles. The workpiece-alignment tool includes accessibility cutouts and access spaces that provide a user simultaneous access to points around a joint formed by objects aligned with the alignment surfaces. In this way, the workpiece-alignment tool provides accessibility that allows a user to operate upon a workpiece, e.g., as by joining aligned objects together, without interfering or obstructing access to the objects.

Further, the workpiece-alignment tool is configured to allow objects to be held or removably affixed to an alignment surface. Holding objects with the workpiece-alignment tool ensures that the alignment of objects with an alignment surface does not change during an operation upon a workpiece. The ability to hold objects is enhanced by the inclusion of cutouts that provide increased access to interior surfaces of the workpiece-alignment tool, such as to increase the area available for use of clamps or other fastening devices.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is an illustration of cross-section views of example workpiece-alignment tools that are operable to employ techniques described herein in accordance with one or more embodiments.

DETAILED DESCRIPTION

Overview

Many conventional alignment tools are substantially planar, i.e. flat, and do not provide sufficient surfaces on which to align objects. Further, conventional alignment tools tend to obstruct user access to the objects being aligned, particularly around points of joinder. Additionally, conventional alignment tools lack the ability to hold objects to ensure that the objects are not unintentionally moved. Thus, many conventional alignment tools have been found to be unable to adequately align objects during operation upon a workpiece.

Accordingly, workpiece-alignment tools and techniques are described. In one example, a workpiece-alignment tool includes multiple side panels that include alignment surfaces that may be utilized to align and/or hold objects. The workpiece-alignment tool includes at least one cutout adjacent an alignment surface. The cutout increases the exposed and accessible area of the corresponding alignment surface, thus providing an increased area upon the alignment surface that may be utilized to clamp or otherwise fasten a workpiece to the tool. Further, a single side panel may provide multiple alignment surfaces, for instance an inner alignment surface and an outer alignment surface. By providing an inner alignment surface that is parallel to an outer alignment surface of the same side panel, clamps or other fasteners may be utilized to ensure that alignment and positioning of objects will not be unintentionally altered.

In another example, the workpiece-alignment tool includes alignment surfaces that are joined to one another and oriented at corresponding specific angles. Accessibility cutouts and access spaces are provided adjacent the alignment surfaces to provide a user simultaneous access to points around a joint formed by objects aligned with the alignment surfaces. In this way, the workpiece-alignment tool provides accessibility that allows a user to operate upon a workpiece, e.g., as by joining aligned objects together, without interfering or obstructing access to the objects.

In the following discussion, example workpiece-alignment tools are described that may employ the techniques described herein. Example scenarios are then described in which the example workpiece-alignment tools are utilized to align and/or hold example workpieces. Performance of the example scenarios is not limited to the example workpiece-alignment tools, and the example workpiece-alignment tools are not limited to performance of the example scenarios.

Workpiece-Alignment Tools

FIGS. 1-7 depict various example workpiece-alignment tools that are operable to employ techniques described herein.

Figure 1:
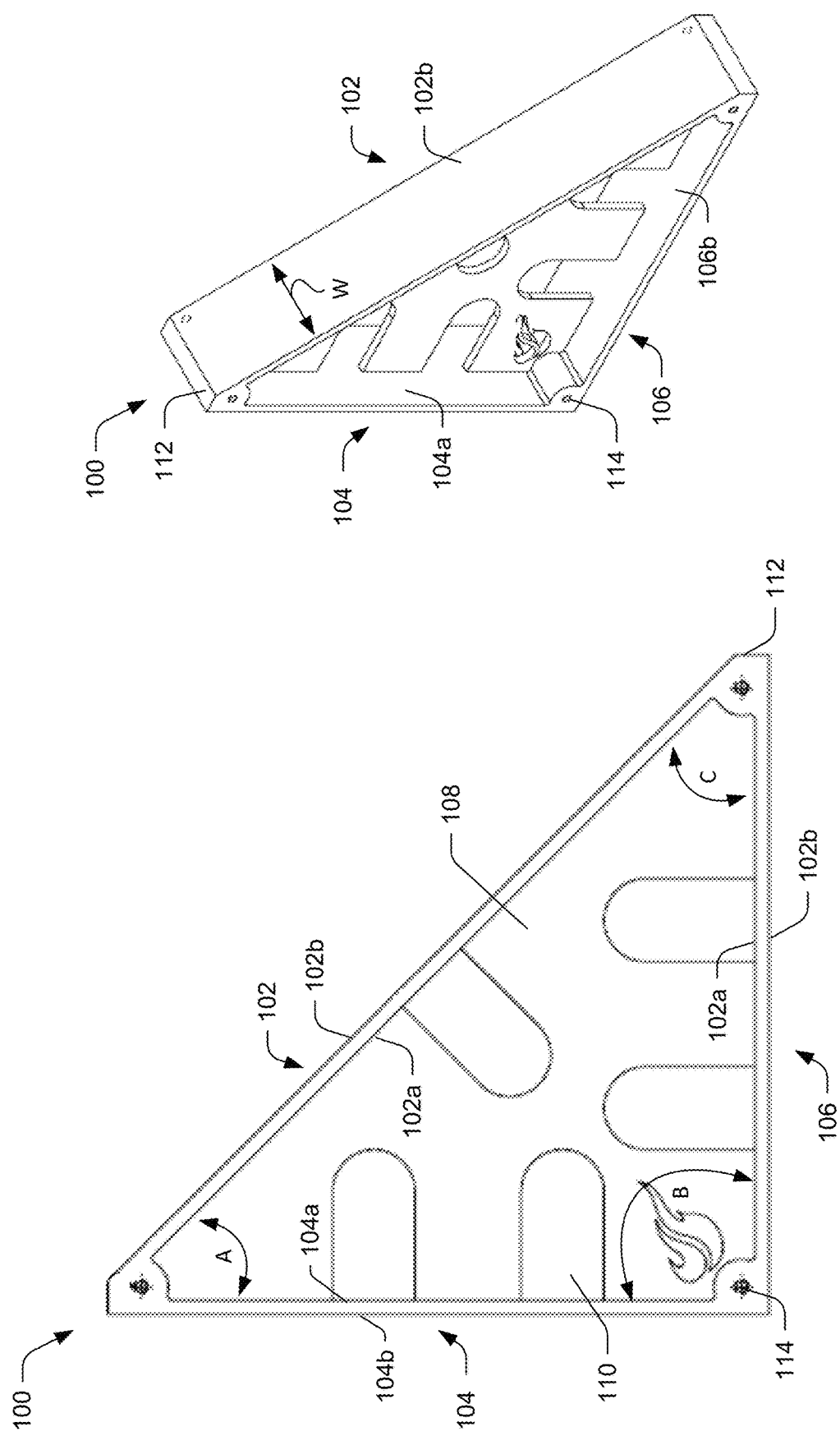
FIG. 1 is an illustration of an example workpiece-alignment tool that is operable to employ alignment techniques described herein in accordance with one or more embodiments.

FIG. 1 depicts a workpiece-alignment tool 100 (shown from two different perspectives) that is operable to employ techniques described herein. The workpiece-alignment tool 100 includes side panels 102, 104, and 106. The side panels 102, 104, and 106 each have an interior surface and an exterior surface. For example, the side panel 102 has interior surface 102a and exterior surface 102b. Likewise, the side panel 104 has interior surface 104a and exterior surface 104b, and the side panel 106 has interior surface 106a and exterior surface 106b. The side panels 102, 104, and 106 are each connected by their respective interior surface to a diaphragm 108.

The side panels 102, 104, and 106 of the workpiece-alignment tool 100 provide flat surfaces, e.g., the respective interior and exterior surfaces, for aligning, clamping, fastening, holding, or measuring materials or workpieces, and so forth. The side panels 102, 104, and 106 are joined to one another to form respective angles A, B, and C. In the illustrated and described embodiment of FIG. 1, side panel 102 and the side panel 104 form an angle A of 45-degrees, the side panel 102 and the side panel 106 form an angle of 45-degrees, side panel 104 and the side panel 106 form an angle B of 90-degrees, and side panel 106 and side panel 102 form an angle C of 45-degrees. Accordingly, workpieces aligned with (e.g., clamped to) adjacent side panels of the workpiece-alignment tool 100 will become aligned, one to another, at corresponding specific angles.

The side panels 102, 104, and 106 each have a respective width, illustrated as "W" in the rightmost illustration. The width W is sufficiently large to provide an area upon which nearly any workpiece can become easily aligned with the respective side panel. As an example, the area provided by a side panel is large enough to ensure that a cylindrical workpiece will always contact the side panel at a point of tangency. In some embodiments, the side panels have a width W ranging from about 1.5" to about 3", and lengths ranging from about 8" to about 17". Other dimensions can, of course, be used without departing from the spirit and scope of the claimed subject matter.

The diaphragm 108 is a structural support that connects the various side panels and holds angular alignments among the various side panels. In embodiments, the diaphragm 108 is connected to at least a part of each respective interior surface of the side panels 102-106. The region generally bounded by the interior surfaces of the side panels 102-106 may be considered an interior region of the workpiece-alignment tool 100, and thus the diaphragm 108 is disposed within the interior region. In some embodiments, the diaphragm is centered with respect to the width of the side panels as described further with respect to FIG. 3. In other embodiments, the diaphragm is aligned to an edge of the side panels with respect to their width as described further with respect to FIG. 3.

The diaphragm 108 includes a plurality of cutouts 110. Each of the cutouts 110 is partially bounded by one of the side panels 102, 104, or 106. The cutouts 110 are pass-through openings for fasteners or clamps, and increase the accessibility to and exposed area of the interior surfaces of the respective side panel. In this way, a clamp or fastener may easily be attached to or access portions of the interior surface along the full width of the respective side panel, without interference from the diaphragm 108. In some embodiments, the cutouts have a width ranging from about 1" to about 2" and lengths ranging from about 2" to about 3". The size and shape of each respective cutout may be referred to by its footprint, e.g., a two-dimensional region as seen from a viewpoint perpendicular to the diaphragm 216.

In some embodiments, the workpiece-alignment tool 100 includes at least one weld relief 112 at the joinder of two side panels. The weld relief 112 is an external cutout that prevents the exterior surfaces of the respective side panels from reaching a point of intersection. The weld relief 112 allows the workpiece-alignment tool 100 to be aligned with workpieces despite the presence of deposited weld materials. For example, two workpieces that have been welded to form an acute angle may include a welding bead inside of the acute angle. In such an example, the welding bead obstructs conventional tools from becoming properly aligned with the workpieces, while the workpiece-alignment tool 100 with the weld relief 112 is capable of becoming flush with both workpieces and achieving proper alignment.

Further, in some embodiments the workpiece-alignment tool 100 includes at least one tapped hole 114. The tapped hole 114 allows various attachments to be removably affixed to the workpiece-alignment tool 100, as described in greater detail with respect to FIGS. 8 and 9. In some embodiments, the tapped hole 114 is a ¼"-20 tapped hole. As illustrated, the tapped hole 114 is parallel to the width of one or more side panels. In some embodiments, the workpiece-alignment tool 100 includes additional holes, such as holes through a side panel that may be utilized to fasten the workpiece-alignment tool 100 to a modular welding table. For example, the workpiece-alignment tool 100 may include ⅝" through-holes in the side panels for the purpose of alignment with ⅝" holes in a modular welding table.

In embodiments, the workpiece-alignment tool 100 is a made from a metal such as steel, iron, or aluminum, however any suitable substance may be utilized such as various metals, woods, plastics, and so forth. In embodiments, the workpiece-alignment tool 100 is a single solid object created from CNC machining, however any suitable formation technique may be utilized such as 3D printing a single solid object, or by attaching multiple objects together such as by gluing, welding, fastening with screws, and so forth.

Figure 2:
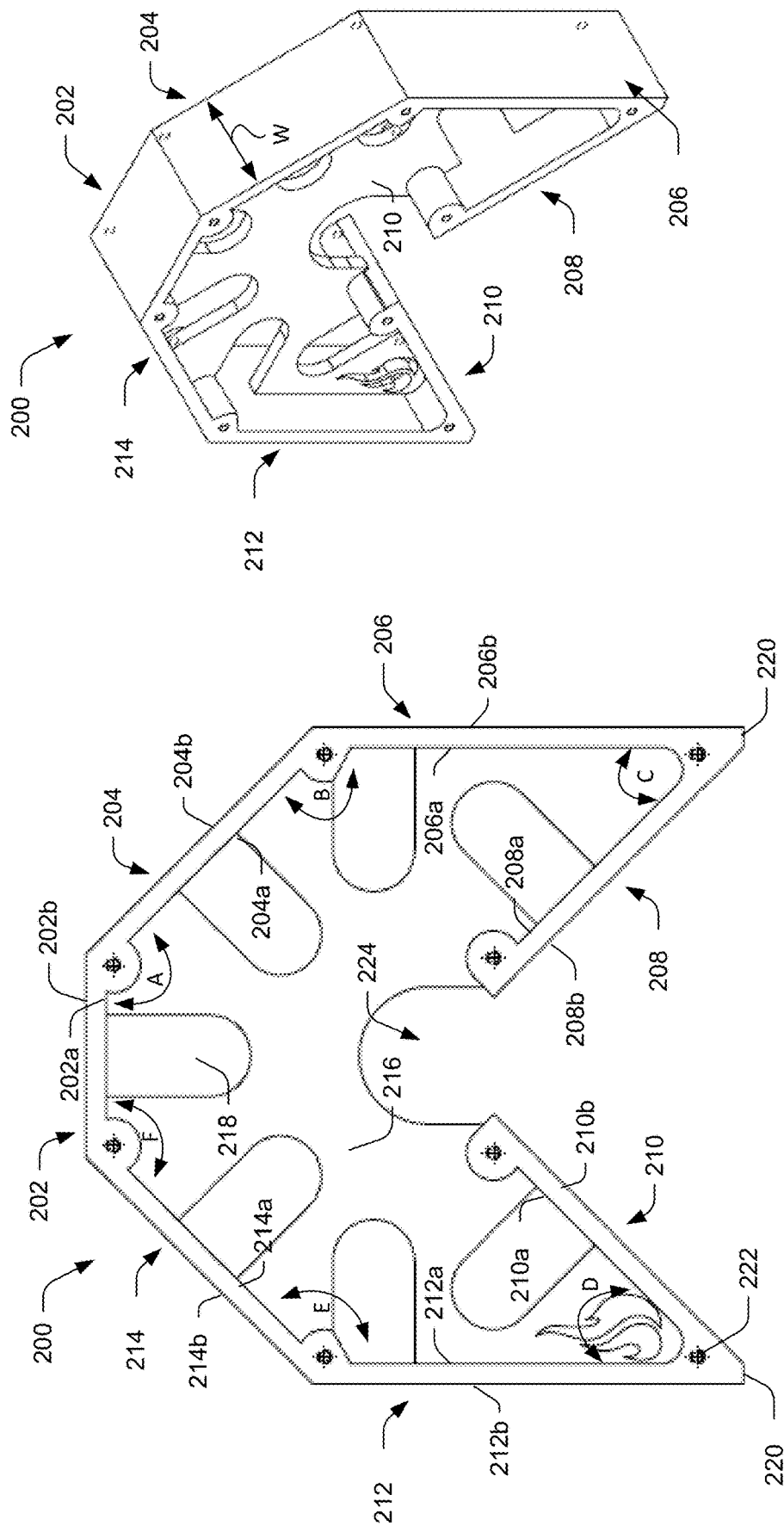
FIG. 2 is an illustration of an example workpiece-alignment tool that is operable to employ alignment techniques described herein in accordance with one or more embodiments.

FIG. 2 depicts a workpiece-alignment tool 200 (shown from two different perspectives) that is operable to employ techniques described herein. The workpiece-alignment tool 200 includes side panels 202, 204, 206, 208, 210, 212, and 214. Each of the side panels 202-214 have an interior surface and an exterior surface. For example, the side panel 202 has interior surface 202a and exterior surface 202b. Likewise, the side panel 204 has interior surface 204a and exterior surface 204b, the side panel 206 has interior surface 206a and exterior surface 206b, and the side panel 208 has interior surface 208a and exterior surface 208b, and so forth. The side panels 202-208 are each connected by their respective interior surface to a diaphragm 216.

The side panels 202-214 of the workpiece-alignment tool 200 provide flat surfaces, e.g., the respective interior and exterior surfaces, for aligning, clamping, fastening, holding, or measuring materials or workpieces, and so forth. Each of the side panels 202-214 is joined to at least one other of the side panels 202-214 to form respective angles A, B, C, D, E, and F. In the illustrated and described embodiment of FIG. 2, the side panel 202 and the side panel 204 form an angle A of 135-degrees, the side panel 204 and the side panel 206 form an angle B of 135-degrees, the side panel 206 and the side panel 208 form an angle C of 45-degrees, the side panel 210 and the side panel 212 form and angle D of 45-degrees, the side panel 212 and the side panel 214 form an angle E of 135-degrees, and the side panel 214 and the side panel 202 form an angle F of 135-degrees. In such embodiments, the side panel 202 is at a right angle with respect to the side panel 206 and the side panel 212, the side panel 204 is at a right angle with respect to the side panel 210 and the side panel 214, and the side panel 214 is at a right angle with respect to the side panel 204 and the side panel 208. Accordingly, workpieces aligned with (e.g., clamped to) adjacent side panels of the workpiece-alignment tool 200 will become aligned, one to another, at corresponding specific angles.

The side panels 202-214 each have a respective width, illustrated as "W" in the rightmost illustration. The width W is sufficiently large to provide an area upon which nearly any workpiece can become easily aligned with the respective side panel. As an example, the area provided by a side panel is large enough to ensure that a cylindrical workpiece will always contact the side panel at a point of tangency. In some embodiments, the side panels 202-214 have a width W ranging from about 1.5" to about 3", and lengths ranging from about 3.5" to about 12". Other dimensions can, of course, be used without departing from the spirit and scope of the claimed subject matter.

The diaphragm 216 is a structural support that connects the various side panels and holds angular alignments among the various side panels. In embodiments, the diaphragm 216 is connected to at least a part of each respective interior surface of the side panels 202-214. The region generally bounded by the interior surfaces of the side panels 202-214 may be considered an interior region of the workpiece-alignment tool 200, and thus the diaphragm 216 is disposed within the interior region. In some embodiments, the diaphragm is centered with respect to the width of the side panels as described further with respect to FIG. 3. In other embodiments, the diaphragm is aligned to an edge of the side panels with respect to their width as described further with respect to FIG. 3.

The diaphragm 216 includes a plurality of cutouts 218. Each of the cutouts 218 is partially bounded by one of the side panels 202-214. The cutouts 218 are pass-through openings for fasteners or clamps, and increase the accessibility to and exposed area of the interior surface of the respective side panel. In this way, a clamp or fastener may easily be attached to or access portions of the interior surface along the full width of the respective side panel, without interference from the diaphragm 216. In some embodiments, the cutouts have a width ranging from about 1" to about 2" and lengths ranging from about 2" to about 3". The size and shape of each respective cutout may be referred to by its footprint, e.g., a two-dimensional region as seen from a viewpoint perpendicular to the diaphragm 216.

In some embodiments, the workpiece-alignment tool 200 includes at least one weld relief 220 at the joinder of two side panels. The weld relief 220 is an external cutout that prevents the exterior surfaces of the respective side panels from reaching a point of intersection. The weld relief 220 allows the workpiece-alignment tool 200 to be aligned with workpieces despite the presence of deposited weld materials. For example, two workpieces that have been welded to form an acute angle may include a welding bead inside of the acute angle. In such an example, the welding bead obstructs conventional tools from becoming properly aligned with the workpieces, while the workpiece-alignment tool 200 with the weld relief 220 is capable of becoming flush with both workpieces and achieving proper alignment. Further, in some embodiments the weld reliefs 220 may provide aligned surfaces similar to a side panel. The weld reliefs 220 depicted in FIG. 2 provide aligned surfaces on a plane that is parallel to the side panel 202.

Further, in some embodiments the workpiece-alignment tool 200 includes at least one tapped hole 222. The tapped hole 222 allows various attachments to be removably affixed to the workpiece-alignment tool 200, as described in greater detail with respect to FIGS. 8 and 9. In some embodiments, the tapped hole 222 is a ¼"-20 tapped hole. As illustrated, the tapped hole 222 is parallel to the width of one or more side panels. In some embodiments, the workpiece-alignment tool 200 includes additional holes, such as holes through a side panel that may be utilized to fasten the workpiece-alignment tool 200 to a modular welding table. For example, the workpiece-alignment tool 200 may include ⅝" through-holes in the side panels for the purpose of alignment with ⅝" holes in a modular welding table.

The workpiece-alignment tool 200 further includes a master cutout 224. The master cutout 224 is partially bounded by the diaphragm 216 and is generally unbounded by any of the side panels 202-214. The master cutout 224 is an opening that provides accessibility for joining workpieces displaced within or proximate to the master cutout 224, as described in greater detail with respect to FIGS. 5, 12, and 13. In some embodiments, the master cutout 224 has a radius ranging from about 0.5" to about 2". The size and shape of the master cutout 224 may be referred to by its footprint, e.g., a two-dimensional region as seen from a viewpoint perpendicular to the diaphragm 216. In some embodiments, the footprint of the master cutout 224 is larger than the footprint of any other cutout, e.g. the cutouts 218.

The workpiece-alignment tool 200 is balanced such that the workpiece-alignment tool 200 can stand on any one of the side panels 202, 204, 206, 212, 214, or on the weld reliefs 220. In embodiments, the workpiece-alignment tool 200 is a made from a metal such as steel, iron, or aluminum, however any suitable substance may be utilized such as various metals, woods, plastics, and so forth. In embodiments, the workpiece-alignment tool 200 is a single solid object created from CNC machining, however any suitable formation technique may be utilized such as 3D printing a single solid object, or by attaching multiple objects together such as by gluing, welding, fastening with screws, and so forth.

FIG. 3 depicts embodiments of the workpiece-alignment tool 200, including two alternate embodiments taken along line A-A. The diaphragm 216 is oriented to be orthogonal to each of the side panels 202-214. In some embodiments, the diaphragm is centered with respect to the width of the side panels as depicted in the cutout perspective 300. In other embodiments, the diaphragm is aligned to an edge of the side panels with respect to their width as depicted in the cutout perspective 302.

Figure 4:
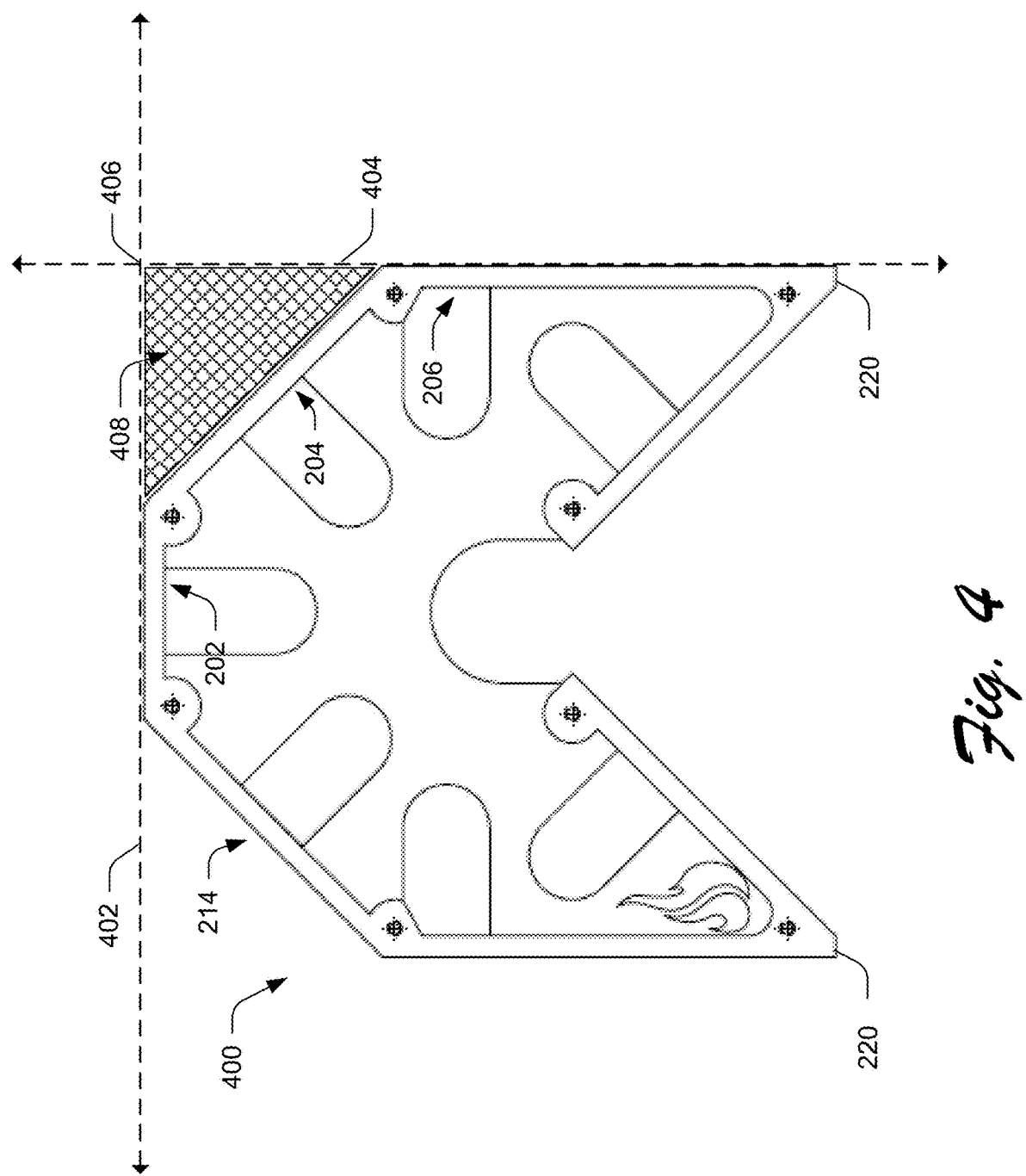
FIG. 4 is an illustration of alignment planes formed by surfaces of an example workpiece-alignment tool that is operable to employ techniques described herein in accordance with one or more embodiments.

FIG. 4 depicts a workpiece-alignment tool 400 in accordance with one or more embodiments. The workpiece-alignment tool 400 may be, for example, the workpiece-alignment tool 200 of FIG. 2. Planes 402 and 404 extend into and out of the page upon which FIG. 4 appears, and are aligned with two side panels of the workpiece-alignment tool 400. In the illustrated and described embodiment of FIG. 4, plane 402 is aligned with side panel 202, and plane 404 is aligned with side panel 206. The planes 402 and 404 are depicted with dotted lines, and continue infinitely as indicated by arrows at the ends of the depicted lines. The planes 402 and 404 intersect at a point 406. The area generally bounded by the plane 402, the plane 404, and the side panel 204 corresponds to an access space 408.

The access space 408 provides accessibility for joining workpieces that are located proximate to the planes 402 and/or 404, or to workpieces located within the access space 408 itself. For example, if substantially straight workpieces are aligned with the side panels 202 and 206, respectively, they are also aligned with the planes 402 and 404, respectively, and may form a joint at the point 406. In such an example, a user has unobstructed access to the access space 408. By virtue of the access space 408, the user may operate upon the workpiece at any portion of the joint formed at the point 406, including on portions of the joint that are only accessible via the access space 408.

The workpiece-alignment tool 400 includes a plurality of access spaces, however for visual clarity only a single access space 408 is expressly depicted. The access spaces may vary in size and/or shape. In embodiments, there is an access space adjacent to each of the side panels 202, 204, 206, 212, and 214. For instance, an access space adjacent to side panel 202 is generally bounded by the side panel 202 and by planes aligned with the side panels 204 and 214. In the illustrated and described embodiment of FIG. 4, the access space adjacent to side panel 202 is smaller than the access space 408 that is adjacent to side panel 204. As another example, an access space adjacent to the side panel 206 is generally bounded by the side panel 206, a plane aligned with the side panel 204, and a plane aligned with the weld reliefs 220. In the illustrated and described embodiment of FIG. 4, the access space adjacent to side panel 206 is smaller than the access space 408 that is adjacent to side panel 204. In this way, the workpiece-alignment tool 400 provides various access spaces of differing shapes and sizes. The access spaces may be utilized not only for direct access to the region, but may also be utilized to align objects despite obstructions proximate to the access space. For instance, the objects forming a joint near the point 406 may include a welding bead other protrusion that extends into the access space 408. The access space 408 allows the objects to be aligned with the side panels 202 and 206 despite the protrusion, whereas a conventional tool would be unable to align the objects.

Figure 5:
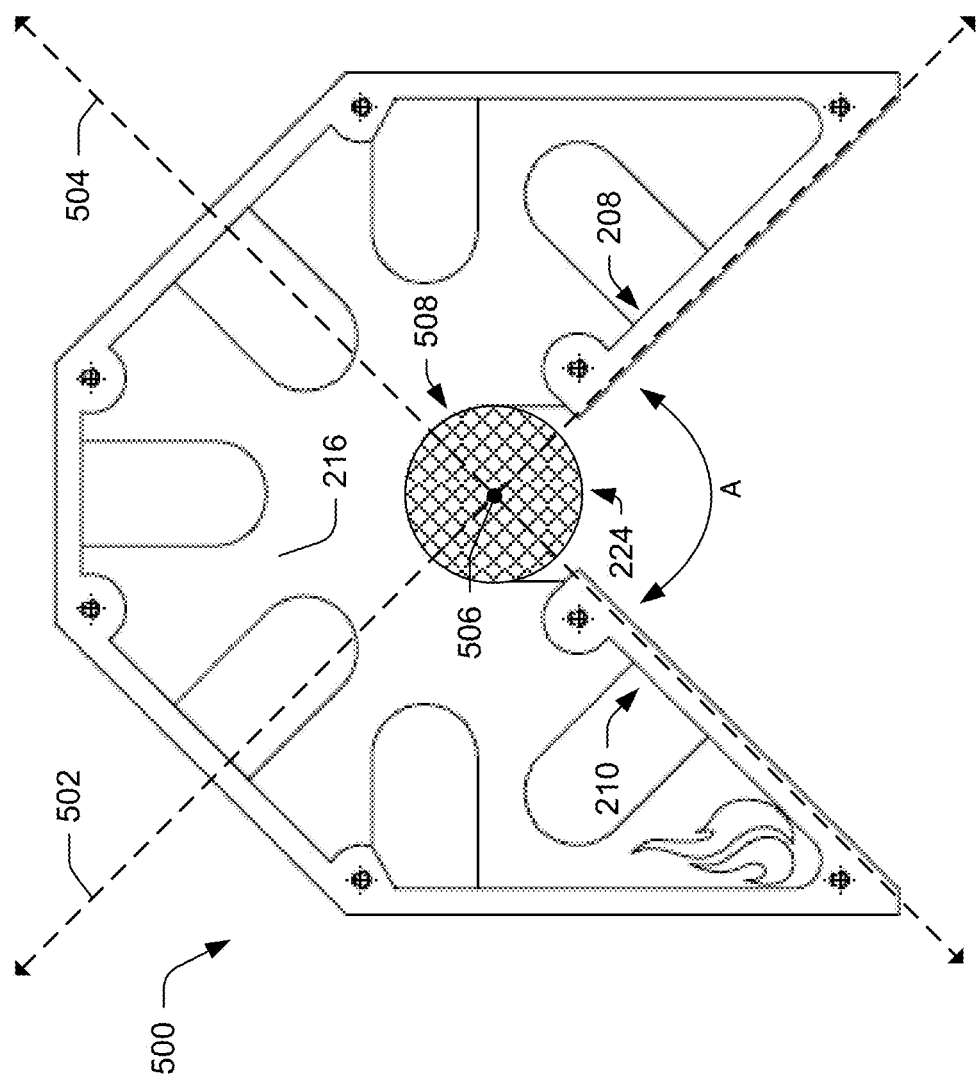
FIG. 5 is an illustration of cutouts in relation to alignment planes formed by surfaces of an example workpiece-alignment tool that is operable to employ techniques described herein in accordance with one or more embodiments.

FIG. 5 depicts a workpiece-alignment tool 500 that is operable to employ techniques described herein. The workpiece-alignment tool 500 may be, for example, the workpiece-alignment tool 200 of FIG. 2. The diaphragm 216 is aligned with a reference plane that extends along the page upon which FIG. 5 appears. The side panel 208 is aligned with a plane 502, and the side panel 210 is aligned with a second plane 504. The first plane 502 and the second plane 504 are depicted with dotted lines, extend into and out of the page upon which FIG. 5 appears, and continue infinitely as indicated by arrows at the ends of the depicted lines. In the illustrated and described embodiment of FIG. 5, the reference plane, the first plane 502, and the second plane 504 are orthogonal planes, and thus the diaphragm 216, the side panel 208, and the side panel 210 are orthogonal to one another.

The workpiece-alignment tool 500 further includes a master cutout 224. The master cutout 224 is partially bounded by the diaphragm 216 and is generally unbounded by the side panels 208 and 210. The master cutout 224 is an opening that generally extends from a point 506 that is the intersection of the planes 502 and 504. In the illustrated and described embodiment of FIG. 5, the master cutout 224 is generally circular in shape extending a radius from the point 506, as depicted by the circular region 508. The side panels 208 and 210 each include a cutout that extends a distance from the point 506 that is greater than the radius of the circular region 508.

Figure 6:
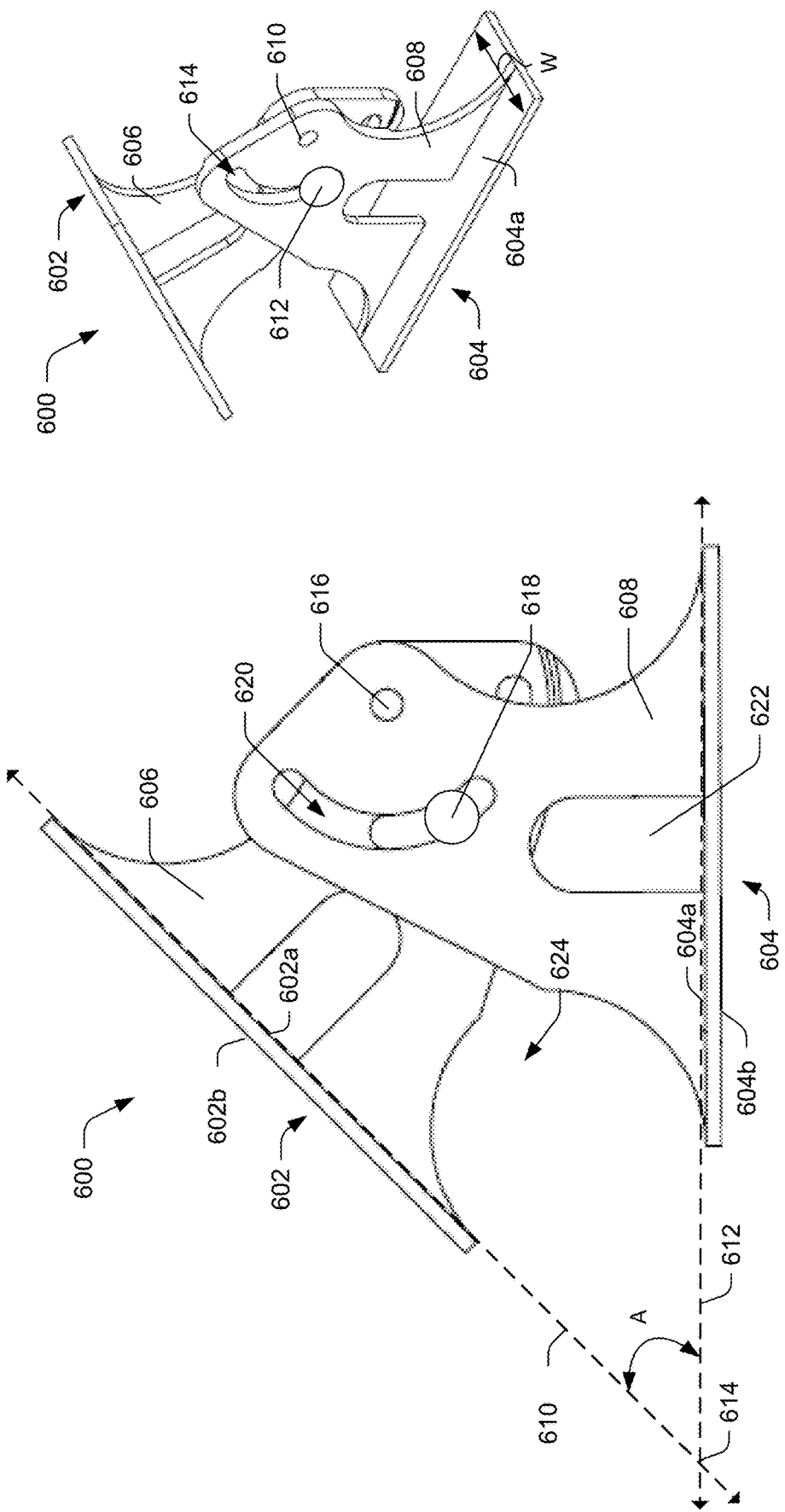
FIG. 6 is an illustration of an example workpiece-alignment tool that is operable to employ techniques described herein in accordance with one or more embodiments.

FIG. 6 depicts a workpiece-alignment tool 600 (shown from two different perspectives) that is operable to employ techniques described herein. The workpiece-alignment tool 600 includes side panels 602 and 604. The side panels 602 and 604 each have an interior surface and an exterior surface. For example, the side panel 602 has interior surface 602a and exterior surface 602b. Likewise, the side panel 604 has interior surface 604a and exterior surface 604b. The side panel 602 is connected by the interior surface 602a to a diaphragm 606, and the side panel 604 is connected by the interior surface 604a to a diaphragm 608.

The side panels 602 and 604 of the workpiece-alignment tool 600 provide flat surfaces, e.g., the respective interior and exterior surfaces, for aligning, clamping, fastening, holding, or measuring materials or workpieces, and so forth. The side panels 602 and 604 form an angle A in relation to one another. The angle A is not a fixed angle, and in the illustrated and described embodiment of FIG. 6, the angle A can be varied up to about 100-degrees. The side panel 602 and the side panel 604 do not contact one another, and the angle A may be conceptualized based on planes aligned with the side panel 602 and the side panel 604. In the illustrated and described embodiment of FIG. 6, the side panel 602 is aligned with a plane 610 and the side panel 604 is aligned with a plane 612. The planes 610 and 612 are depicted as dotted lines and extend into and out of the page upon which FIG. 6 appears, and continue infinitely as indicated by arrows at the ends of the depicted lines. The planes 610 and 612 intersect at a point 614, which is consider as a point forming the angle A.

Accordingly, workpieces aligned with (e.g., clamped to) the side panels 602 and 604 will become aligned, one to another, at a specific yet variable angle A. The side panels 602 and 604 each have a respective width, illustrated as "W" in the rightmost illustration. The width W is sufficiently large to provide an area upon which nearly any workpiece can become easily aligned with the respective side panel. As an example, the area provided by a side panel is large enough to ensure that a cylindrical workpiece will always contact the side panel at a point of tangency. In some embodiments, the side panels have a width W ranging from about 1.5" to about 3", and lengths ranging from about 6" to about 12". Other dimensions can, of course, be used without departing from the spirit and scope of the claimed subject matter.

The diaphragms 606 and 608 are structural supports that connect the side panels 602 and 604. The diaphragm 606 and the diaphragm 608 are connected via a hinge 616. The hinge 616 is offset a distance from the point 614, which allows the angle A to be varied without obstructing access to objects located at point 614. The diaphragms 606 and 608 may freely pivot around the hinge 616, subject to a hinge constraint 618. In embodiments, the hinge constraint 618 is received within a corresponding slot 620. Motion of the workpiece-alignment tool 600 around the hinge is described in greater detail with respect to FIG. 7.

The hinge constraint 618 may be any mechanism that is capable of locking the hinge in place, thereby fixing the side panels at a specific angle. For example, in some embodiments the hinge constraint 618 includes a nut and bolt placed through a slot 620 in each of the diaphragms 606 and 608, capable of squeezing the diaphragms 606 and 608 together when the nut is tightened. In other embodiments, the hinge constraint 618 may be included as a part of the hinge 616 itself. When the hinge constraint 618 is activated to lock the hinge in place, the side panels 602 and 604 are held at a particular angular alignment. In some embodiments, the workpiece-alignment tool 600 may include markings or indicators that designate the angle created by a current position of the hinge 616.

The diaphragms 606 and 608 are generally centered with respect to the width of the side panels. However, due to the split diaphragm of the workpiece-alignment tool 600, the diaphragms 606 and 608 occupy parallel adjacent planes and may cause a sideways displacement with respect to the width of the side panels. In some embodiments, one or both of the diaphragms 606 and 608 are offset from center to compensate for this displacement and to maintain alignment of the side panels 602 and 604.

The diaphragms 606 and/or 608 may each include a plurality of cutouts 622. Each of the cutouts 622 is partially bounded by one of the side panels 602 or 604. The cutouts 622 are pass-through openings for fasteners or clamps, and increase the accessibility to and exposed area of the interior surface of each respective side panel. In this way, a clamp or fastener may easily be attached to or access portions of the interior surface along the full width of the respective side panel, without interference from the respective one of diaphragms 606 or 608. In some embodiments, the cutouts have a width ranging from about 1" to about 2" and lengths ranging from about 2" to about 3". The size and shape of each respective cutout may be referred to by its footprint, e.g., a two-dimensional region as seen from a viewpoint perpendicular to the diaphragm 216.

The workpiece-alignment tool 600 further includes a master cutout 624. The master cutout 624 is partially bounded by the diaphragms 606 and 608, and is generally unbounded by the side panels 602 and 604. The master cutout 624 is an opening that provides accessibility for joining workpieces displaced within or proximate to the master cutout 624, as described in greater detail with respect to FIGS. 14 and 15.

In embodiments, the workpiece-alignment tool 600 is a made from a metal such as steel, iron, or aluminum, however any suitable substance may be utilized such as various metals, woods, plastics, and so forth. In embodiments, each component including a side panel and a diaphragm (e.g. the side panel 602 and the diaphragm 606, or the side panel 604 and the diaphragm 608) is a single solid object created from CNC machining, however any suitable formation technique may be utilized such as 3D printing a single solid object, or by attaching multiple objects together such as by gluing, welding, fastening with screws, and so forth.

Figure 7:
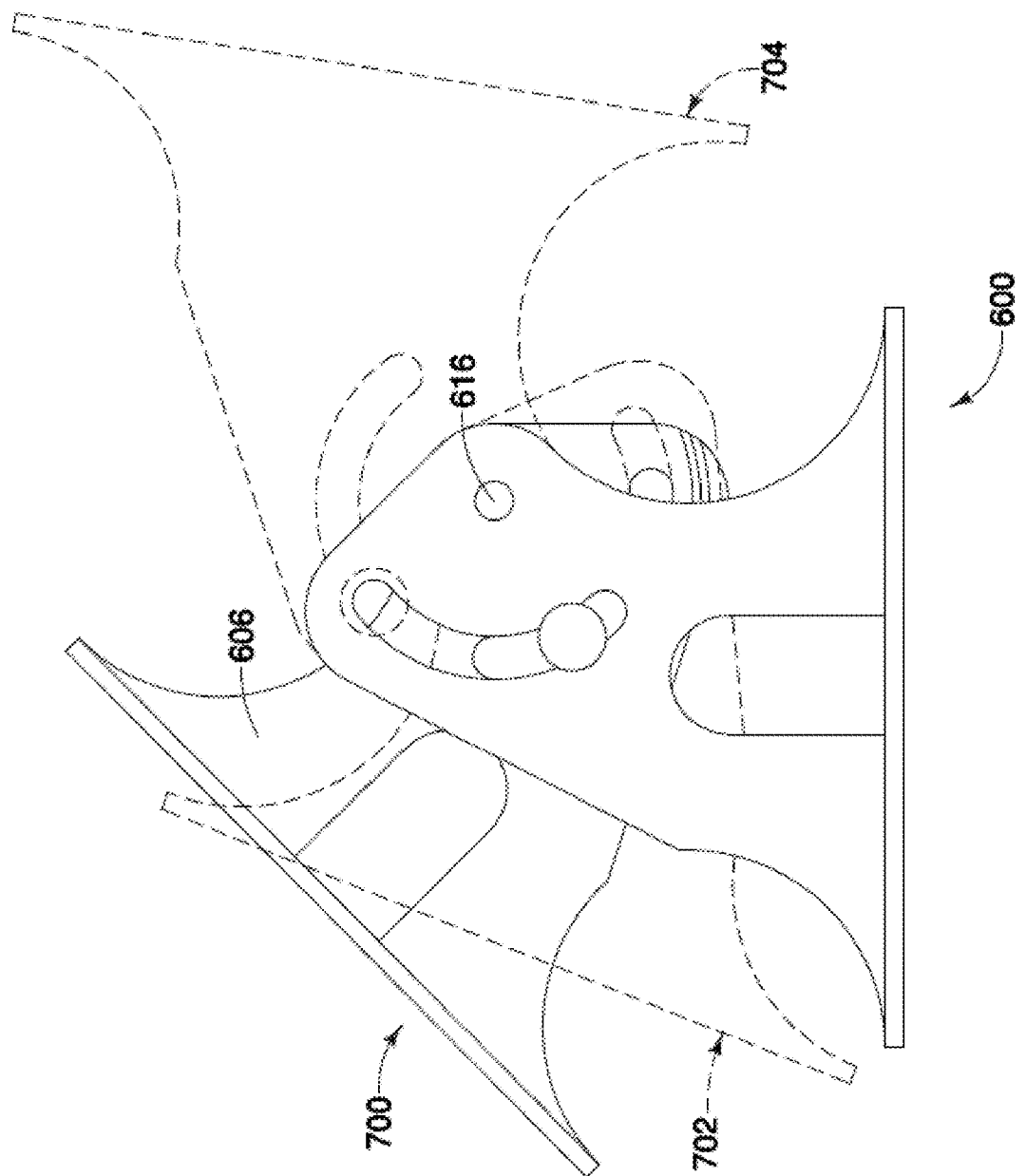
FIG. 7 is an illustration of exemplary physical states of an example workpiece-alignment tool that is operable to employ techniques described herein in accordance with one or more embodiments.

FIG. 7 depicts the workpiece-alignment tool 600, depicted with solid lines in a first state 700. As the diaphragm 606 rotates about the hinge 616, the angle formed by the side panels changes. The diaphragm 606 may be rotated to alter the alignment of the side panels with respect to one another. Dashed lines depicting a second state 702 illustrate the diaphragm 606 having been rotated to increase the interior angle formed by the side panels. Since the hinge 616 is an offset hinge that is not located proximate either of the planes forming the angle, the side panels are parallel with a fixed displacement when the angle is 0-degrees. When the diaphragm 606 is rotated beyond 0-degrees, the angle is formed on the opposite side of the workpiece-alignment tool 600, as depicted by dashed lines in a third state 704. Thus, the workpiece-alignment tool 600 is capable of forming angles on the left side of the device (e.g., states 700 and 702) such that the intersection of planes of the side panels occurs at a point located to the left of the hinge, and is also capable of forming angles on the right side of the device (e.g., state 704) such that the intersection of planes of the side panels occurs at a point located to the right of the hinge. In some embodiments, the workpiece-alignment tool 600 can form an interior angle that varies anywhere from about 100-degrees on the left side to about 100-degrees on the right side.

Figure 8:
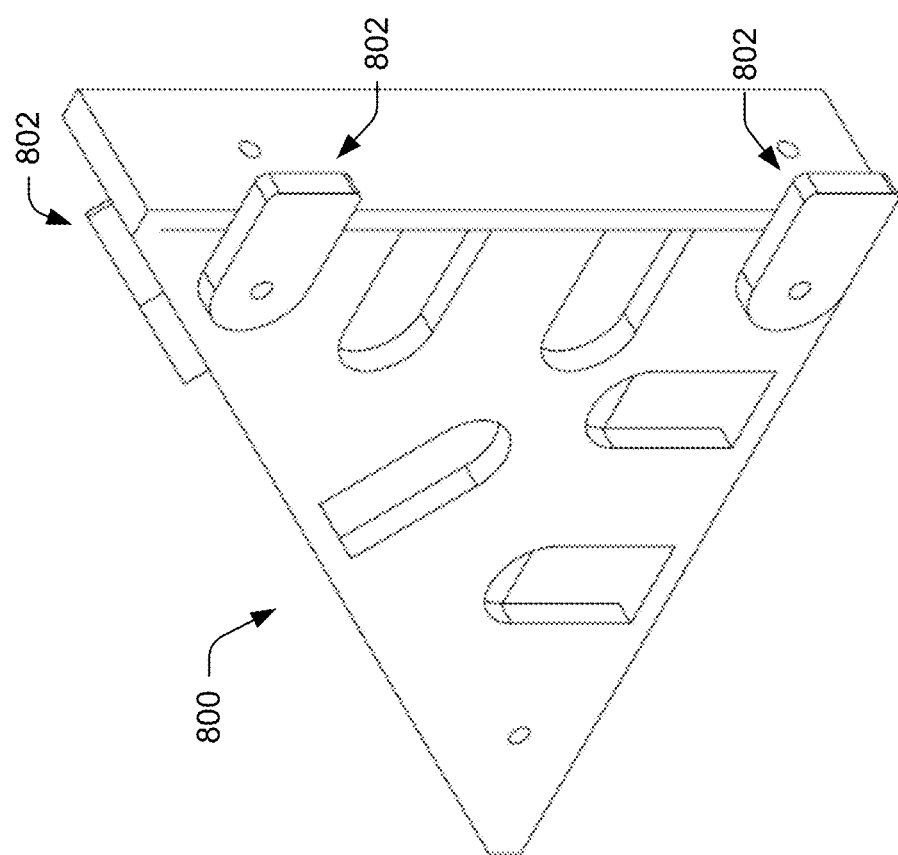
FIG. 8 is an illustration of an example workpiece-alignment tool that has been modified to include various alignment attachments in accordance with one or more embodiments.

FIG. 8 depicts an example scenario in which a workpiece-alignment tool 800 is modified to include various attachments 802. The attachments 802 may be any implement capable of assisting in the alignment of workpieces with respect to the workpiece-alignment tool 800. The attachments 802 may, for instance, be affixed to the workpiece-alignment tool 800 by inserting a screw through the attachments 802 and into tapped holes located in the workpiece-alignment tool 800. In this scenario, the attachments 802 are depicted as flat tabs. By attaching the tabs to the workpiece-alignment tool 800, additional contact areas are created that provide additional or alternative planes with which to align workpieces. As an example, the workpiece-alignment tool 800 may be placed on a flat surface, forming a 90-degree angle between the flat surface and a side panel of the workpiece-alignment tool 800. In such an example, the addition of the attachments 802 perpendicular to a side panel provides a third, orthogonal contact surface, allowing any workpiece to be quickly oriented against three orthogonal surfaces.

Figure 9:
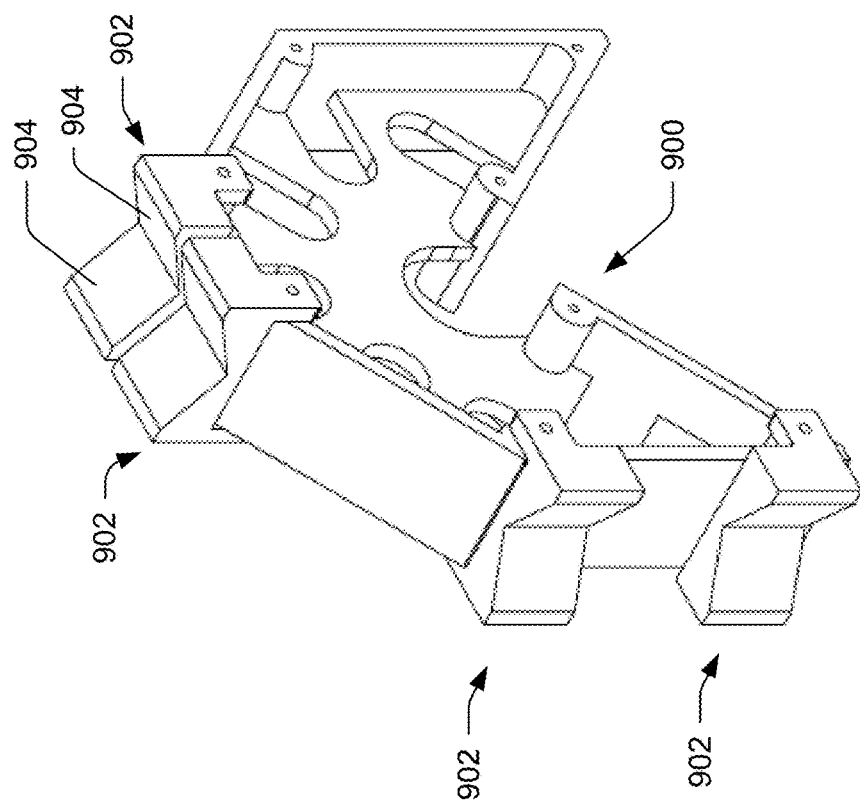
FIG. 9 is an illustration of an example workpiece-alignment tool that has been modified to include various alignment attachments in accordance with one or more embodiments.

FIG. 9 depicts an example scenario in which a workpiece-alignment tool 900 is modified to include various attachments 902. The attachments 902 may be any implement capable of assisting in the alignment of workpieces with respect to the workpiece-alignment tool 900. The attachments 902 may, for instance, be affixed to the workpiece-alignment tool 900 by inserting a screw through the attachments 902 and into tapped holes located in the workpiece-alignment tool 900. In this scenario, the attachments 902 are depicted as blocks with a 'V' shaped notch. The notch in this example is centered with respect to the width of the side panels of the workpiece-alignment tool 900, such that flat surfaces extend in equal but opposite directions from a central deepest point of the notch. By adding the blocks to the workpiece-alignment tool 900, additional contact areas (e.g., contact areas 904) are created that provide additional or alternative planes with which to align workpieces. For example, a cylindrical workpiece may be placed into the notches of one or more blocks, becoming aligned with the central point of the notch. In such an example, the addition of the attachments 902 allows a cylindrical workpiece (a shape that is generally difficult to align using conventional tools) to be quickly and easily aligned not only with the plane of a side panel of the workpiece-alignment tool 900, but also with the plane of a diaphragm of the workpiece-alignment tool 900.

Figure 10:
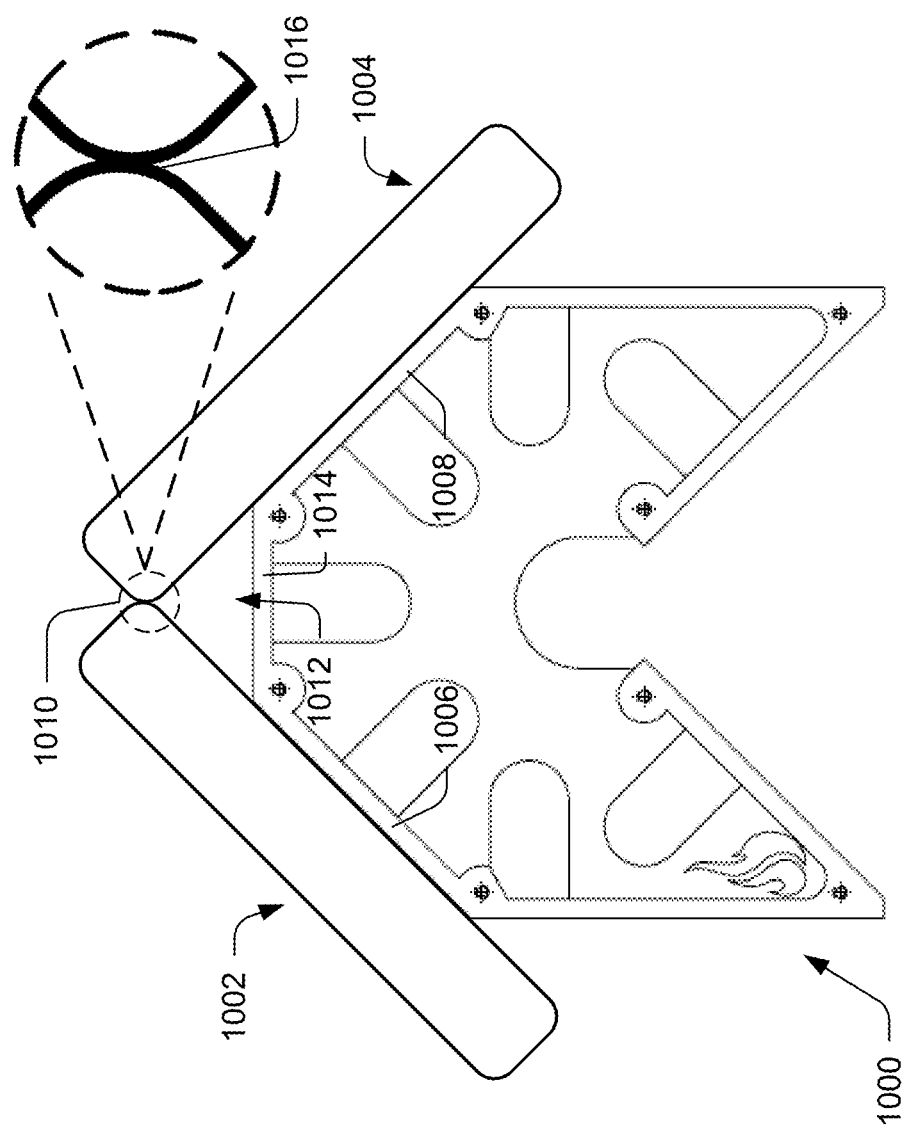
FIG. 10 is an illustration of an example scenario in which two workpieces are aligned at a specific angle through use of an example workpiece-alignment tool in accordance with one or more embodiments.

FIG. 10 depicts an example scenario in which a workpiece-alignment tool 1000 is utilized to align two workpieces 1002 and 1004. The workpiece-alignment tool 1000 may be, for example, the workpiece-alignment tool 200 of FIG. 2. The workpiece-alignment tool 1000 includes a first side panel 1006 and a second side panel 1008. The side panels 1006 and 1008 are perpendicular to one another, but do not intersect or contact each other. The workpiece 1002 is aligned with the first side panel 1006, and the workpiece 1004 is aligned with the second side panel 1008. Accordingly, the workpieces 1002 and 1004 are aligned perpendicular to one another and intersect in a region 1010. However, since the side panels 1006 and 1008 do not intersect but the workpieces 1002 and 1004 do intersect, an access space 1012 is formed between a side panel 1014 and the workpieces 1002 and 1004. The access space 1012 provides access to the inside intersection 1016 of the workpieces 1002 and 1004. This access may be utilized, for example, to insert welding equipment into the access space 1012 and perform welding techniques on the inside intersection 1016 of the joint formed by workpieces 1002 and 1004. Accordingly, a single configuration is capable of providing simultaneous access to all points in proximity to the intersection of workpieces 1002 and 1004.

Optionally, the workpieces 1002 and 1004 may be clamped or otherwise fastened to the side panels 1006 and 1008, respectively. For example, workpiece 1002 may be clamped to the side panel 1006 by affixing a clamping device to an exterior surface of the workpiece 1002 and to the interior surface of the side panel 1006. Likewise, workpiece 1004 may be clamped to the side panel 1008 by affixing a clamping device to an exterior surface of the workpiece 1004 and to the interior surface of the side panel 1008. In some embodiments, a portion of a clamp is passed through a cutout in the workpiece-alignment tool 1000.

Figure 11:
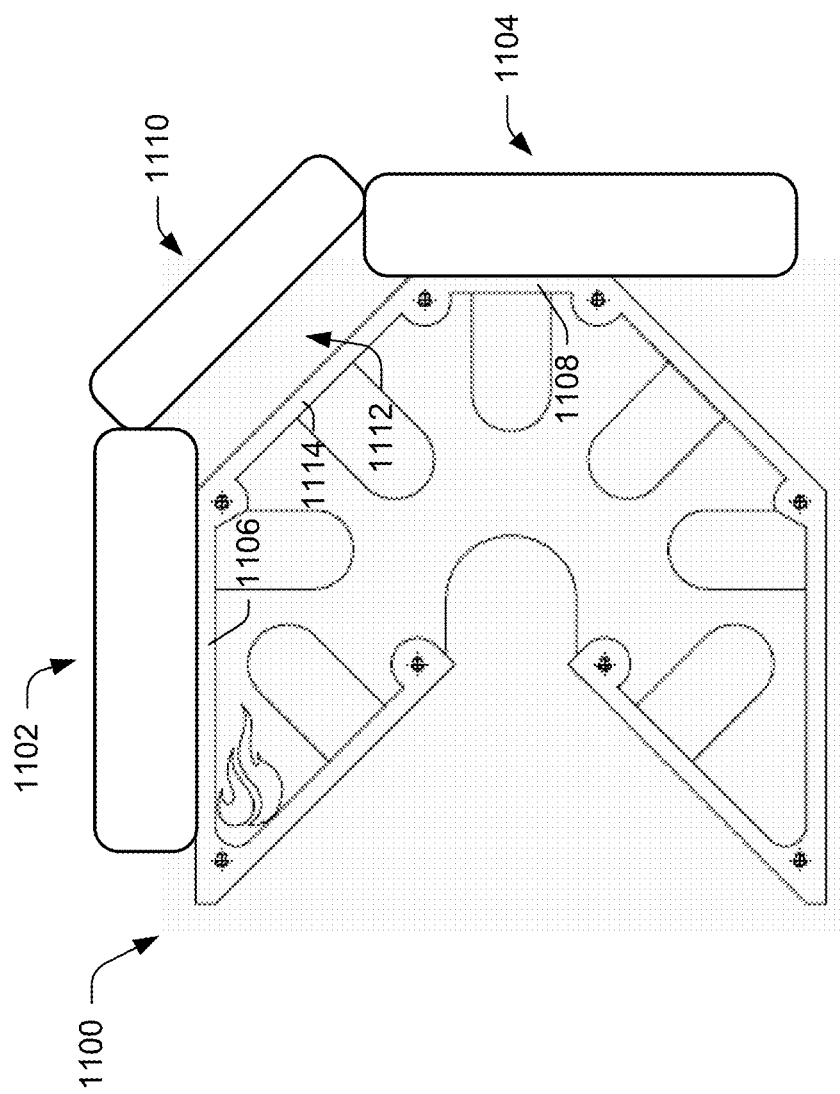
FIG. 11 is an illustration of an example scenario in which workpieces are aligned at specific angles through use of an example workpiece-alignment tool in accordance with one or more embodiments.

FIG. 11 depicts an example scenario in which a workpiece-alignment tool 1100 is utilized to align two workpieces 1102 and 1104. The workpiece-alignment tool 1100 may be, for example, the workpiece-alignment tool 200 of FIG. 2. The workpiece-alignment tool 1100 includes a first side panel 1106 and a second side panel 1108. The side panels 1106 and 1108 are perpendicular to one another, but do not intersect or contact each other. The workpiece 1102 is aligned with the first side panel 1106, and the workpiece 1104 is aligned with the second side panel 1108. Accordingly, the workpieces 1102 and 1104 are aligned perpendicular to one another. However, the workpieces 1102 and 1104 do not intersect and are instead connected indirectly via a workpiece 1110. Despite the lack of direct contact between workpieces 1102 and 1104, their alignment with the workpiece-alignment tool 1100 ensures that the workpieces 1102 and 1104 remain at an angle of 90-degrees with respect to each other, regardless of a positioning or orientation of the workpiece 1110. The workpiece 1110 may obstruct, collide, or overlap with the intersection of planes formed by the side panels 1106 and 1108, and thus a conventional tool is unable to function in this scenario.

Further, an access space 1112 is formed between a side panel 1114 of the workpiece-alignment tool 1100, the first workpiece 1102, the second workpiece 1104, and the third workpiece 1110. The access space 1112 provides access to the inside intersection between workpieces 1102 and 1110, and the inside intersection between workpieces 1104 and 1110. This access may be utilized, for example, to insert welding equipment and perform welding techniques on the interior joints formed by the workpieces 1102, 1104, and 1110. Accordingly, a single configuration is capable of providing simultaneous access to all points in proximity to the intersections of workpieces 1102, 1104, and 1110.

Optionally, the workpieces 1102 and 1104 may be clamped or otherwise fastened to the side panels 1106 and 1108, respectively. For example, workpiece 1102 may be clamped to the side panel 1106 by affixing a clamping device to an exterior surface of the workpiece 1102 and to the interior surface of the side panel 1106. Likewise, workpiece 1104 may be clamped to the side panel 1108 by affixing a clamping device to an exterior surface of the workpiece 1104 and to the interior surface of the side panel 1108. In some embodiments, a portion of a clamp is passed through a cutout in the workpiece-alignment tool 1100.

Figure 12:
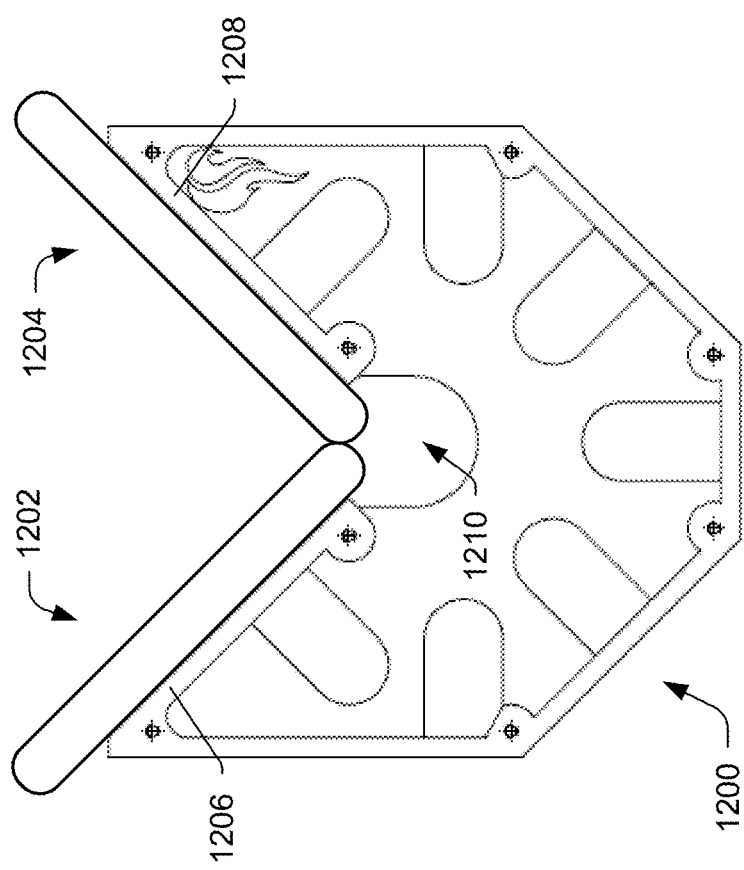
FIG. 12 is an illustration of an example scenario in which two workpieces are aligned at a specific angle through use of an example workpiece-alignment tool in accordance with one or more embodiments.

FIG. 12 depicts an example scenario in which a workpiece-alignment tool 1200 is utilized to align two workpieces 1202 and 1204. The workpiece-alignment tool 1200 may be, for example, the workpiece-alignment tool 200 of FIG. 2. The workpiece-alignment tool 1200 includes a first side panel 1206 and a second side panel 1208. The side panels 1206 and 1208 are perpendicular to one another, but do not intersect or contact each other. Each of the side panels 1206 and 1208 has an interior surface and an exterior surface. The workpiece 1202 is aligned with the exterior surface of the first side panel 1206, and the workpiece 1204 is aligned with the exterior surface of the second side panel 1208. Accordingly, the workpieces 1202 and 1204 are aligned perpendicular to one another. The workpiece-alignment tool 1200 further includes a master cutout 1210. The master cutout 1210 provides access to an exterior joint formed by the workpieces 1202 and 1204. This access may be utilized, for example, to insert welding equipment and perform welding techniques on the exterior joint formed by workpieces 1202 and 1204. Accordingly, a single configuration is capable of providing simultaneous access to all points in proximity to the intersection of workpieces 1202 and 1204.

Optionally, the workpieces 1202 and 1204 may be clamped or otherwise fastened to the side panels 1206 and 1208, respectively. For example, workpiece 1202 may be clamped to the side panel 1206 by affixing a clamping device to an exterior surface of the workpiece 1202 and to the interior surface of the side panel 1206. Likewise, workpiece 1204 may be clamped to the side panel 1208 by affixing a clamping device to an exterior surface of the workpiece 1204 and to the interior surface of the side panel 1208. In some embodiments, a portion of a clamp is passed through a cutout in the workpiece-alignment tool 1200.

Figure 13:
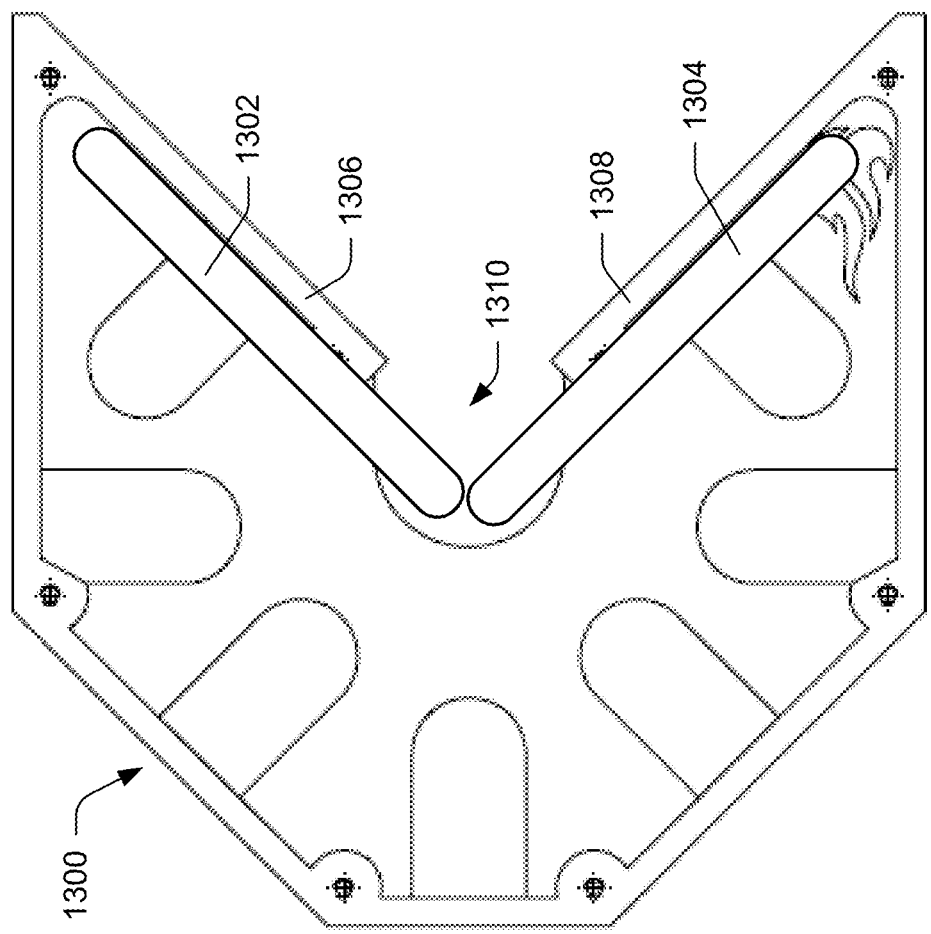
FIG. 13 is an illustration of an example scenario in which two workpieces are aligned at a specific angle through use of an example workpiece-alignment tool in accordance with one or more embodiments.

FIG. 13 depicts an example scenario in which a workpiece-alignment tool 1300 is utilized to align two workpieces 1302 and 1304. The workpiece-alignment tool 1300 may be, for example, the workpiece-alignment tool 200 of FIG. 2. The workpiece-alignment tool 1300 includes a first side panel 1306 and a second side panel 1308. The side panels 1306 and 1308 are perpendicular to one another, but do not intersect or contact each other. Each of the side panels 1306 and 1308 has an interior surface and an exterior surface. The workpiece 1302 is aligned with the interior surface of the first side panel 1306, and the workpiece 1304 is aligned with the interior surface of the second side panel 1308. Accordingly, the workpieces 1302 and 1304 are aligned perpendicular to one another. In some embodiments, when a workpiece is aligned with the interior surface of a side panel, the workpiece may additionally be aligned with the diaphragm.

The workpiece-alignment tool 1300 further includes a master cutout 1310. The master cutout 1310 provides access to both interior and exterior joints formed by the workpieces 1302 and 1304. This access may be utilized, for example, to insert welding equipment and perform welding techniques on the interior and/or exterior joints formed by workpieces 1302 and 1304. Accordingly, a single configuration is capable of providing simultaneous access to all points in proximity to the intersection of workpieces 1302 and 1304.

Optionally, the workpieces 1302 and 1304 may be clamped or otherwise fastened to the side panels 1306 and 1308, respectively. For example, workpiece 1302 may be clamped to the side panel 1306 by affixing a clamping device to an interior surface of the workpiece 1302 and to the exterior surface of the side panel 1306. Likewise, workpiece 1304 may be clamped to the side panel 1308 by affixing a clamping device to an interior surface of the workpiece 1304 and to the exterior surface of the side panel 1308. In some embodiments, a portion of a clamp is passed through a cutout in the workpiece-alignment tool 1300.

Figure 14:
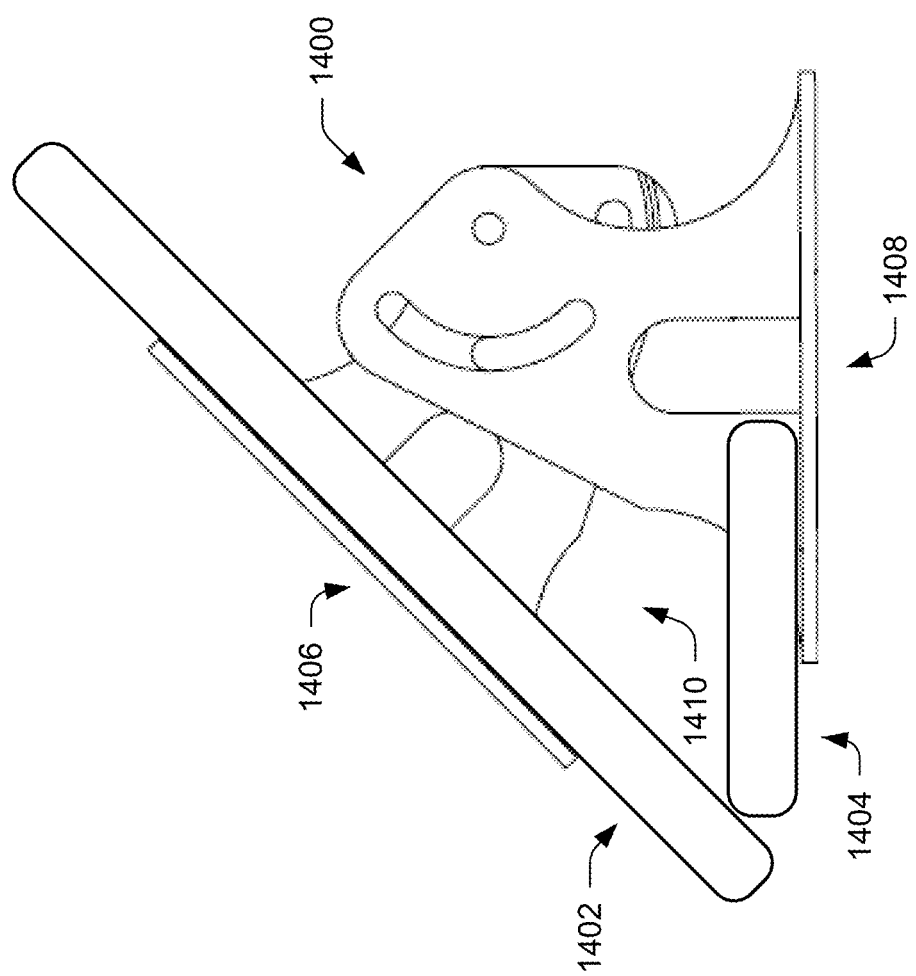
FIG. 14 is an illustration of an example scenario in which two workpieces are aligned at a specific angle through use of an example workpiece-alignment tool in accordance with one or more embodiments.

FIG. 14 depicts an example scenario in which a workpiece-alignment tool 1400 is utilized to align two workpieces 1402 and 1404. The workpiece-alignment tool 1400 may be, for example, the workpiece-alignment tool 300 of FIG. 3. The workpiece-alignment tool 1400 includes a first side panel 1406 and a second side panel 1408. The side panels 1406 and 1408 form an angle with respect to one another, but do not contact or intersect each other. The angle may vary, such as through use of an adjustable hinge indirectly connecting the side panel 1406 to the side panel 1408. Each of the side panels 1406 and 1408 has an interior surface and an exterior surface. The workpiece 1402 is aligned with the interior surface of the first side panel 1406, and the workpiece 1404 is aligned with the interior surface of the second side panel 1408. Accordingly, the workpieces 1402 and 1404 are aligned at a specific angle to one another. When a workpiece is aligned with the interior surface of a side panel, the workpiece may additionally be aligned with the diaphragm.

The workpiece-alignment tool 1400 further includes a master cutout 1410. The master cutout 1410 provides access to an interior joint formed by the workpieces 1402 and 1404. This access may be utilized, for example, to insert welding equipment and perform welding techniques on the interior joint formed by workpieces 1402 and 1404. Accordingly, a single configuration is capable of providing simultaneous access to all points in proximity to the intersection of workpieces 1402 and 1404.

Optionally, the workpieces 1402 and 1404 may be clamped or otherwise fastened to the side panels 1406 and 1408, respectively. For example, workpiece 1402 may be clamped to the side panel 1406 by affixing a clamping device to an interior surface of the workpiece 1402 and to the exterior surface of the side panel 1406. Likewise, workpiece 1404 may be clamped to the side panel 1408 by affixing a clamping device to an interior surface of the workpiece 1404 and to the exterior surface of the side panel 1408. In some embodiments, a portion of a clamp is passed through a cutout in the workpiece-alignment tool 1400.

Figure 15:
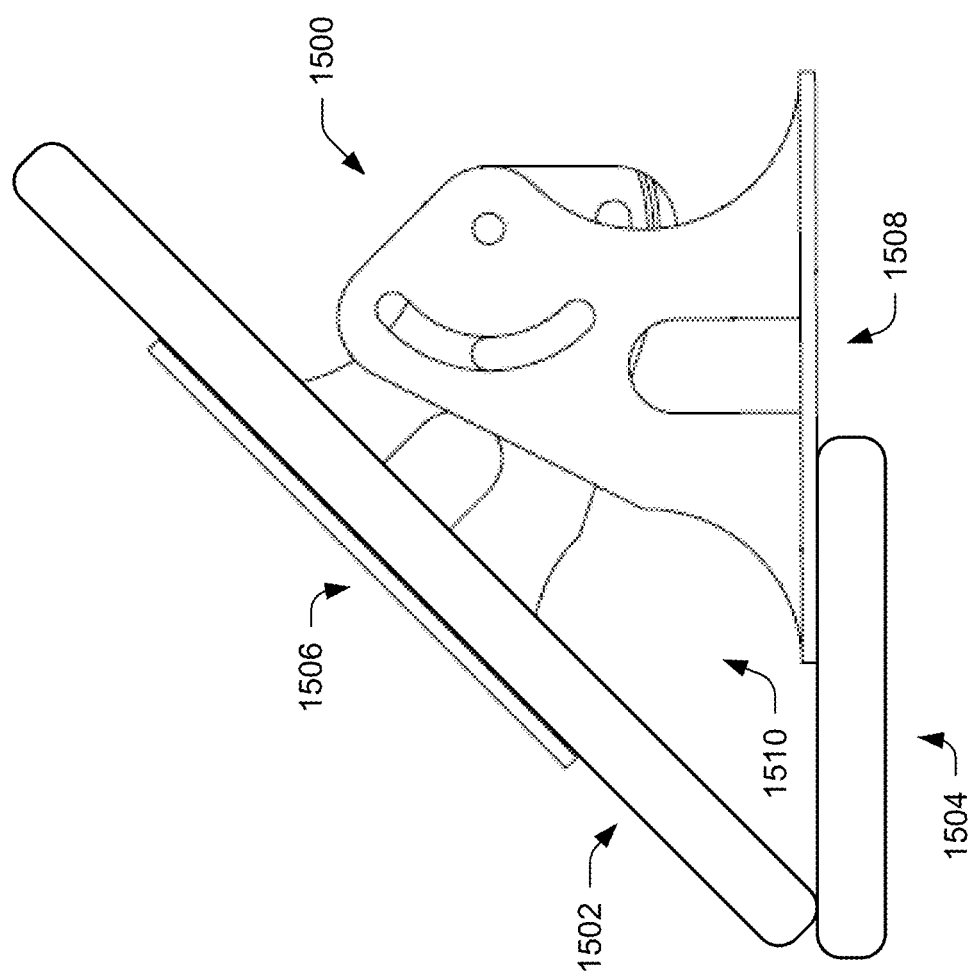
FIG. 15 is an illustration of an example scenario in which two workpieces are aligned at a specific angle through use of an example workpiece-alignment tool in accordance with one or more embodiments.

FIG. 15 depicts an example scenario in which a workpiece-alignment tool 1500 is utilized to align two workpieces 1502 and 1504. The workpiece-alignment tool 1500 may be, for example, the workpiece-alignment tool 300 of FIG. 3. The workpiece-alignment tool 1500 includes a first side panel 1506 and a second side panel 1508. The side panels 1506 and 1508 form an angle with respect to one another, but do not contact or intersect each other. The angle may vary, such as through use of an adjustable hinge indirectly connecting the side panel 1506 to the side panel 1508. Each of the side panels 1506 and 1508 has an interior surface and an exterior surface. The workpiece 1502 is aligned with the interior surface of the first side panel 1506, and the workpiece 1504 is aligned with the exterior surface of the second side panel 1508. Accordingly, the workpieces 1502 and 1504 are aligned at a specific angle to one another. When a workpiece is aligned with the interior surface of a side panel, the workpiece may additionally be aligned with the diaphragm.

The workpiece-alignment tool 1500 further includes a master cutout 1510. The master cutout 1510 provides access to an interior joint formed by the workpieces 1502 and 1504. This access may be utilized, for example, to insert welding equipment and perform welding techniques on the interior joint formed by workpieces 1502 and 1504. Accordingly, a single configuration is capable of providing simultaneous access to all points in proximity to the intersection of workpieces 1502 and 1504.

Optionally, the workpieces 1502 and 1504 may be clamped or otherwise fastened to the side panels 1506 and 1508, respectively. For example, workpiece 1502 may be clamped to the side panel 1506 by affixing a clamping device to an interior surface of the workpiece 1502 and to the exterior surface of the side panel 1506. Likewise, workpiece 1504 may be clamped to the side panel 1508 by affixing a clamping device to an exterior surface of the workpiece 1504 and to the interior surface of the side panel 1508. In some embodiments, a portion of a clamp is passed through a cutout in the workpiece-alignment tool 1500.

Figure 16:
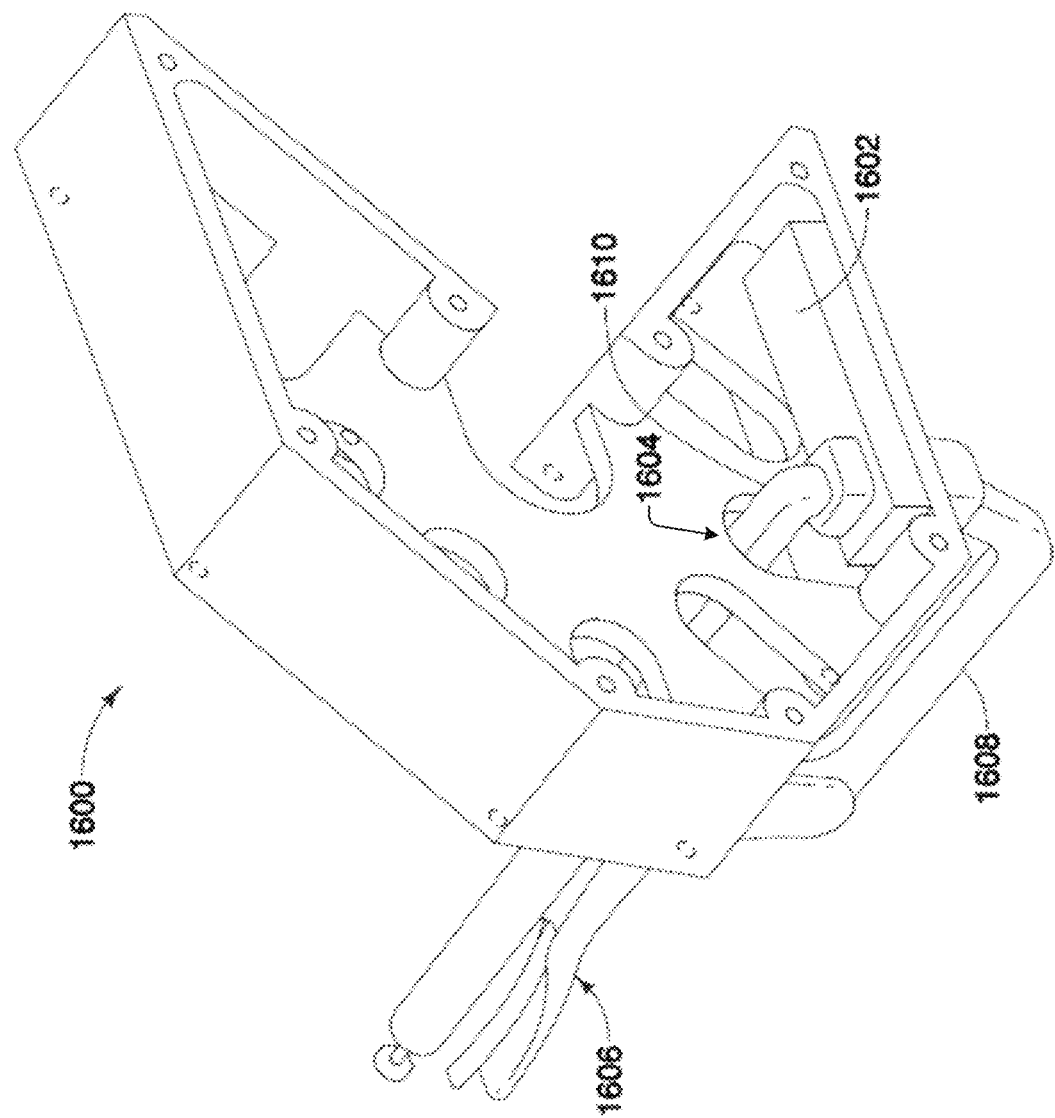
FIG. 16 is an illustration of an example scenario in which a workpiece is affixed to an example workpiece-alignment tool in accordance with one or more embodiments.

FIG. 16 depicts an example scenario in which a workpiece-alignment tool 1600 is utilized to align a workpiece 1602. The workpiece-alignment tool 1600 includes a cutout 1604. The cutout 1604 is a pass-through opening for fasteners or clamps, and increases the accessibility and exposed area of surfaces of a respective side panel. In this way, a clamp or fastener may easily be attached to or access portions of the interior surfaces along the full width of the respective side panel, without interference from the diaphragm.

The workpiece 1602 is removably affixed to the workpiece-alignment tool 1600 through use of a clamp 1606. A first prong 1608 of the clamp 1606 is in contact with a surface of a side panel of the workpiece-alignment tool 1600, while a second prong 1610 of the clamp 1606 is in contact with the workpiece 1602 aligned with the opposite surface of the side panel. To do so, the second prong 1610 is disposed within the cutout 1604.

Figure 17:
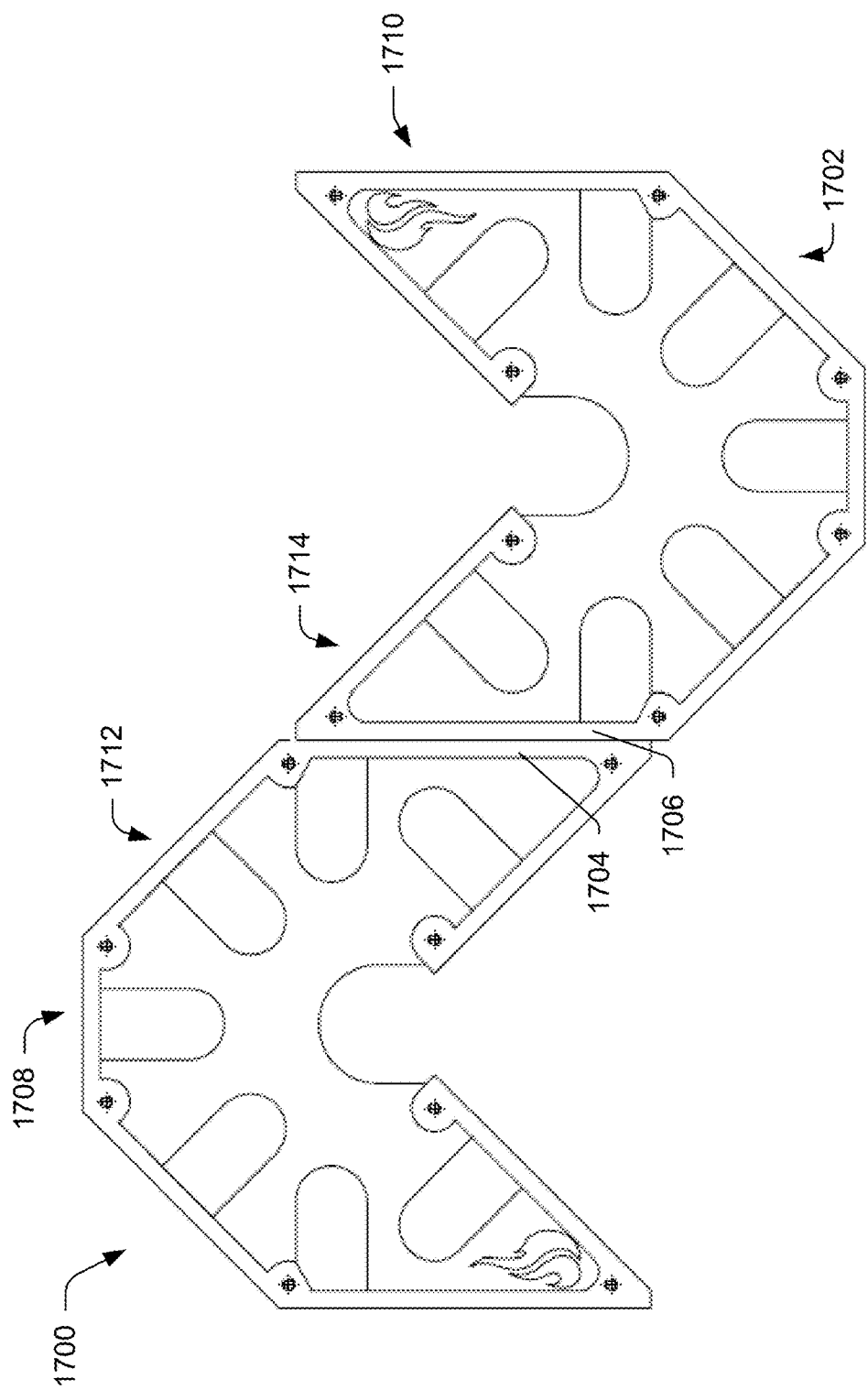
FIG. 17 is an illustration of an example scenario in which two example workpiece-alignment tools are aligned to one another in accordance with one or more embodiments.

FIG. 17 depicts an example scenario in which two example modular workpiece-alignment tools 1700 and 1702 are combined to form additional geometrically aligned surfaces. The workpiece-alignment tool 1700 includes a side panel 1704, and the workpiece-alignment tool 1702 includes a side panel 1706. The side panels 1704 and 1706 are aligned, and may optionally be clamped or otherwise fastened to one another such as described above. In this way, geometric relationships among various side panels of the workpiece-alignment tool 1700 may be expanded to include geometric relationships with various side panels of the workpiece-alignment tool 1702. As an example, side panel 1704 and side panel 1708 of the workpiece-alignment tool 1700 are oriented at an angle of 90-degrees, and side panel 1706 and side panel 1710 of the workpiece-alignment tool 1702 are parallel. In such as example, a modular connection between workpiece-alignment tools 1700 and 1702 as depicted in FIG. 17 expands the available geometric relationships among side panels such as by orienting the side panel 1708 an angle of 90-degrees with respect to side panel 1710. In this way, a workpiece aligned with a side panel of the workpiece-alignment tool 1700 may be precisely aligned with respect to a workpiece aligned with a side panel of the workpiece-alignment tool 1702. Further, the modular workpiece-alignment tools 1700 and 1702 may be positioned to expand a surface. For example, as depicted in FIG. 17, a side panel 1712 of workpiece-alignment tool 1700 is combined with a side panel 1714 of workpiece-alignment tool 1702 to form a substantially continuous surface on a single plane.

Figure 18:
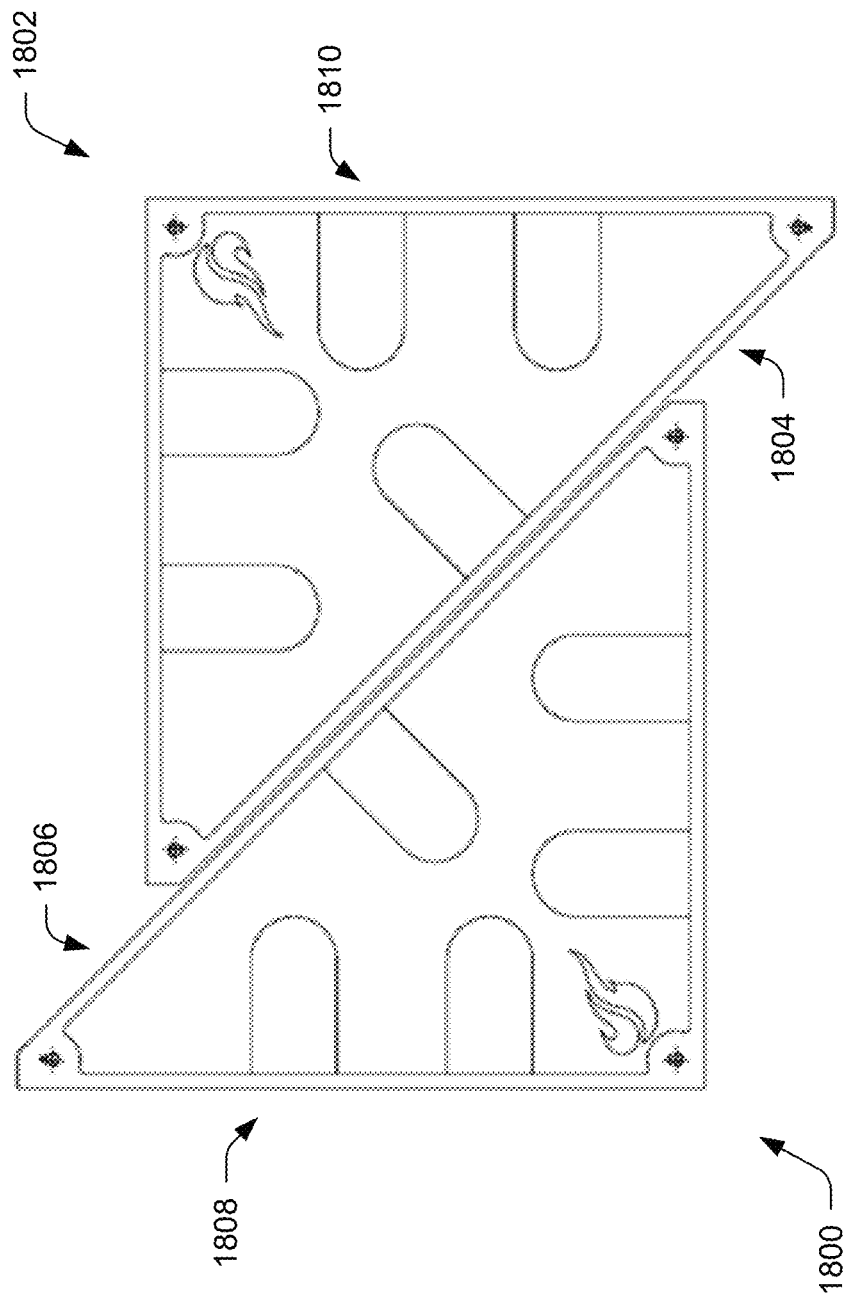
FIG. 18 is an illustration of an example scenario in which two example workpiece-alignment tools are aligned to one another in accordance with one or more embodiments.

FIG. 18 depicts an example scenario in which two example modular workpiece-alignment tools 1800 and 1802 are combined to form additional geometrically aligned surfaces. The workpiece-alignment tool 1800 includes a side panel 1804, and the workpiece-alignment tool 1802 includes a side panel 1806. The side panels 1804 and 1806 are aligned, and may optionally be clamped or otherwise fastened to one another such as described above. In this way, geometric relationships among various side panels of the workpiece-alignment tool 1800 may be expanded to include geometric relationships with various side panels of the workpiece-alignment tool 1802.

As an example, it may be desirable to align two substantially straight workpieces to be parallel with a specified displacement. The workpiece-alignment tools 1800 and 1802 may be moved with respect to one another along the plane formed by side panels 1804 and 1806, thereby increasing or decreasing the displacement between a side panel 1808 of workpiece-alignment tool 1800 and a side panel 1810 of workpiece-alignment tool 1802. While conventional tools require a user to perform multiple manual measurements in multiple locations in order to orient objects to be parallel to one another, the modular workpiece-alignment tools 1800 and 1802 provide parallel planes of a fixed displacement. In this manner, the modular workpiece-alignment tools 1800 and 1802 allow workpieces to be quickly and easily oriented by aligning the workpieces with planes, rather than points.

Figure 19:
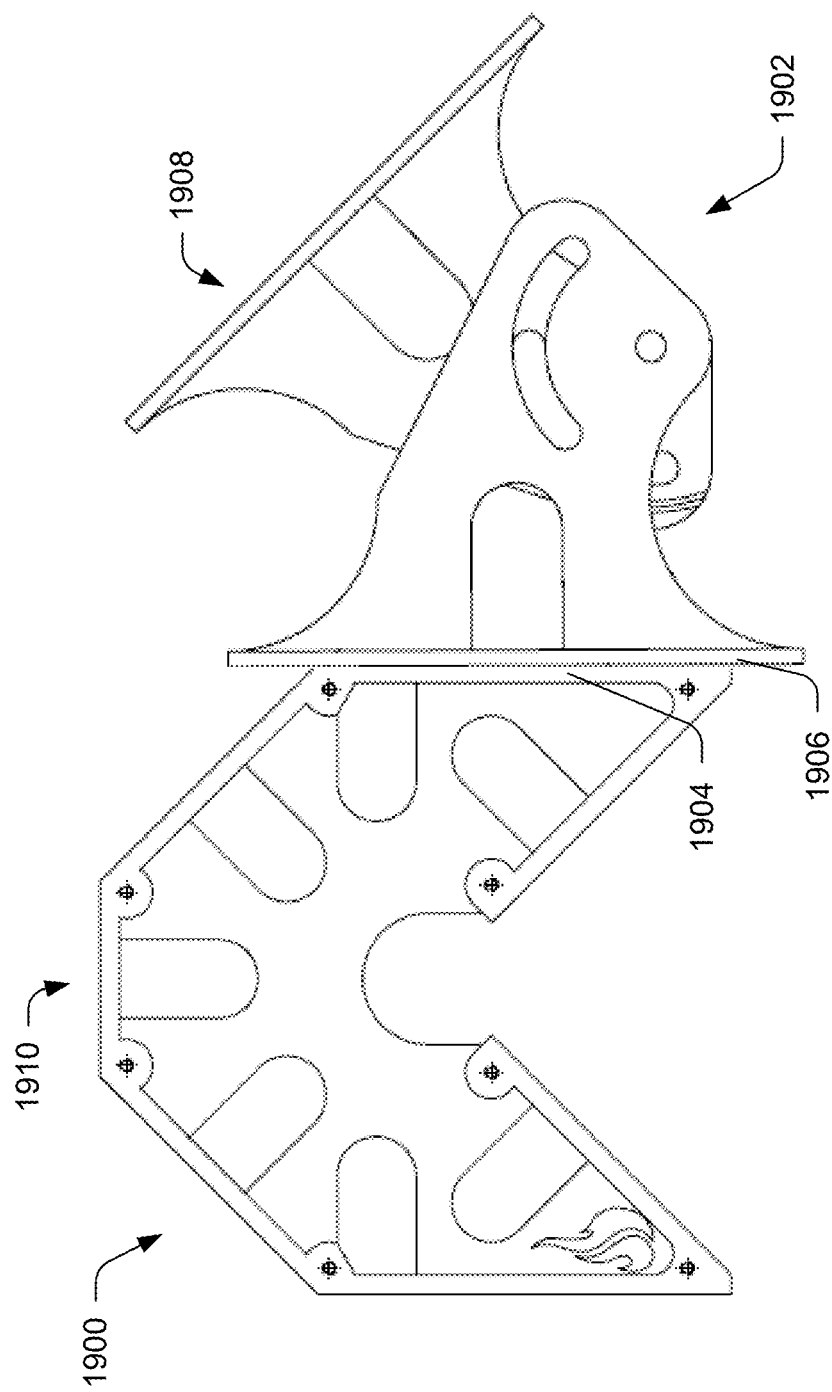
FIG. 19 is an illustration of an example scenario in which two example workpiece-alignment tools are aligned to one another in accordance with one or more embodiments.

FIG. 19 depicts an example scenario in which two example modular workpiece-alignment tools 1900 and 1902 are combined to form additional geometrically aligned surfaces. The workpiece-alignment tool 1900 includes a side panel 1904, and the workpiece-alignment tool 1902 includes a side panel 1906. The side panels 1904 and 1906 are aligned, and may optionally be clamped or otherwise fastened to one another such as described above. In this way, geometric relationships among various side panels of the workpiece-alignment tool 1900 may be expanded to include geometric relationships with a side panel 1908 of the workpiece-alignment tool 1902. Thus, a workpiece aligned with a side panel of the workpiece-alignment tool 1900 may be precisely aligned with respect to a workpiece aligned with the side panel 1908 of the workpiece-alignment tool 1902.

This may be particularly useful, for instance, when an angle is required that is not formed by the workpiece-alignment tool 1900 itself. For example, the side panel 1908 of the workpiece-alignment tool 1902 may be rotated to form a variable angle with respect to the side panel 1910 of the workpiece-alignment tool 1900. This is particularly useful when aligning workpieces at an angle near 180-degrees. Although the workpiece-alignment tool 1900 by itself is capable of aligning the side panels 1906 and 1908 at or near 180-degrees (i.e., parallel), the point of intersection of the planes corresponding to the side panels 1906 and 1908 grows increasingly further away as the angle approaches 180-degrees. By establishing an angular relationship between the side panel 1608 and the side panel 1910, angles at or near 180-degrees may be created with a point of intersection located a reasonable distance (e.g., centimeters or inches) from the workpiece-alignment tools 1900 and 1902.

Figure 20B:
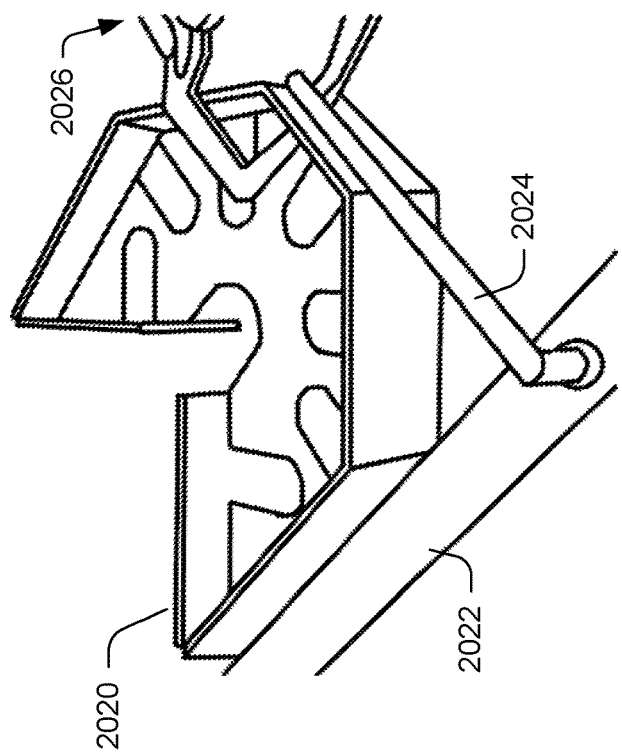
FIGS. 20A, 20B, 21A, 21B, 22A, and 22B illustrate example scenarios in which example workpiece-alignment tools are utilized to align and/or hold various workpieces in accordance with one or more embodiments.
Figure 20A:
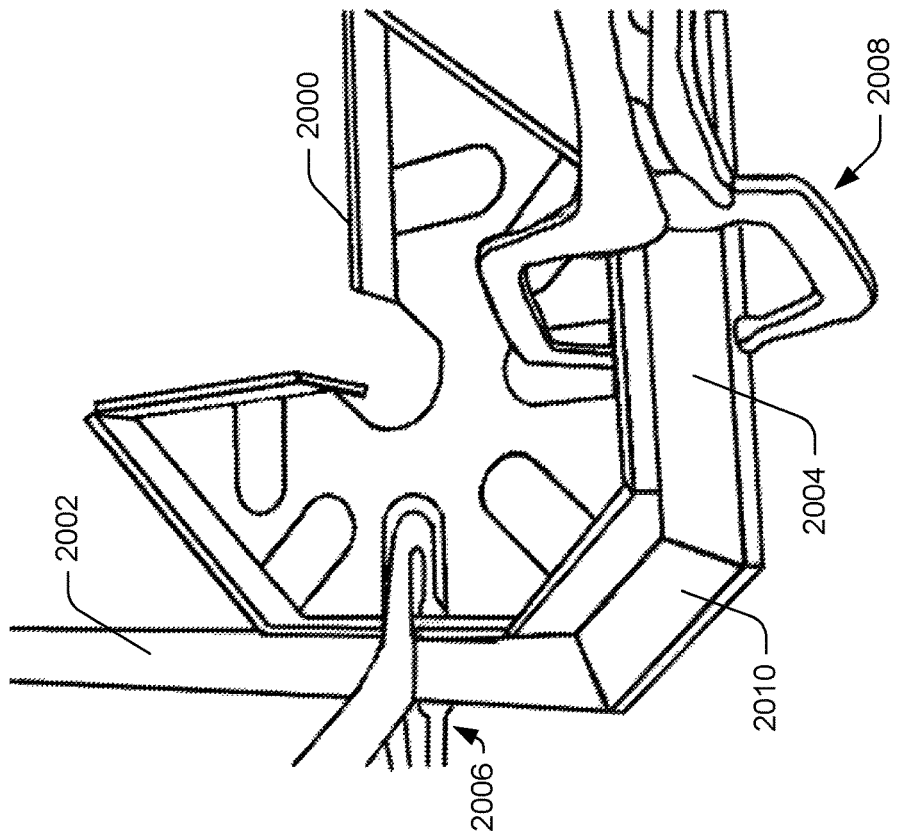

FIG. 20A depicts an example scenario in which a workpiece-alignment tool 2000 is utilized to align and hold various workpieces. In this example, two workpieces 2002 and 2004 are aligned with sides of the workpiece-alignment tool forming a 90-degree angle, and are held to the workpiece-alignment tool by utilizing clamps 2006 and 2008, respectively. However, a third workpiece 2010 is used to form a chamfered corner. Although the workpieces 2002 and 2004 are oriented at 90-degrees with respect to one another, no single joint forms a 90-degree angle. While conventional tools are blocked or obstructed by the workpiece 2010, the workpiece-alignment tool 2000 is able to accurately align and hold the various workpieces.

FIG. 20B depicts an example scenario in which a workpiece-alignment tool 2020 is utilized to align and hold various workpieces. In this example, two workpieces 2022 and 2024 are aligned with sides of the workpiece-alignment tool forming a 90-degree angle, and the workpiece 2024 is held to the workpiece-alignment tool by utilizing a clamp 2026. However, the first workpiece 2022 and the second workpiece 2024 are located on different vertical planes. Although workpieces 2022 and 2024 are oriented at 90-degrees with respect to one another, the workpieces do not intersect on the plane in which the 90-degree angle is formed. While conventional tools are unable to align objects that are located on different parallel planes, the workpiece-alignment tool 2020 is able to accurately align and hold the various workpieces.

Figure 21B:
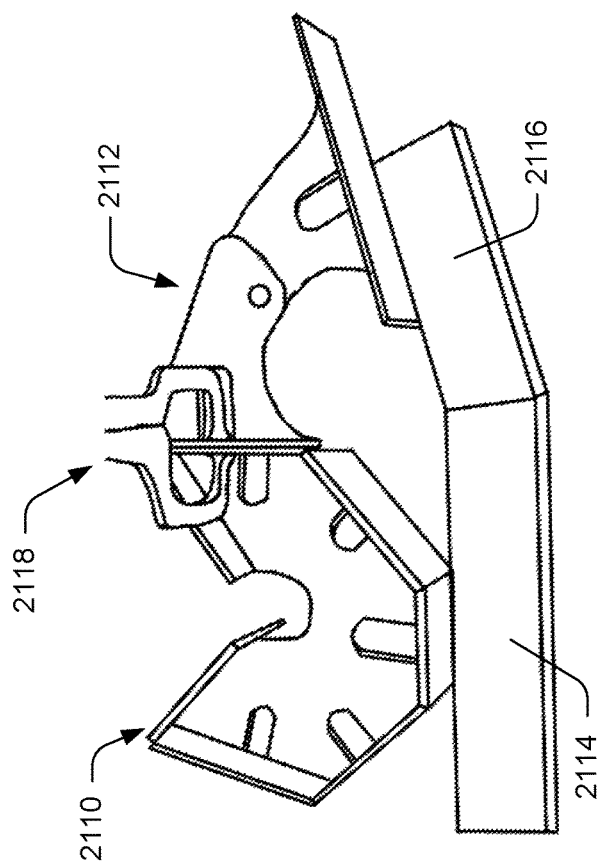
Figure 21A:
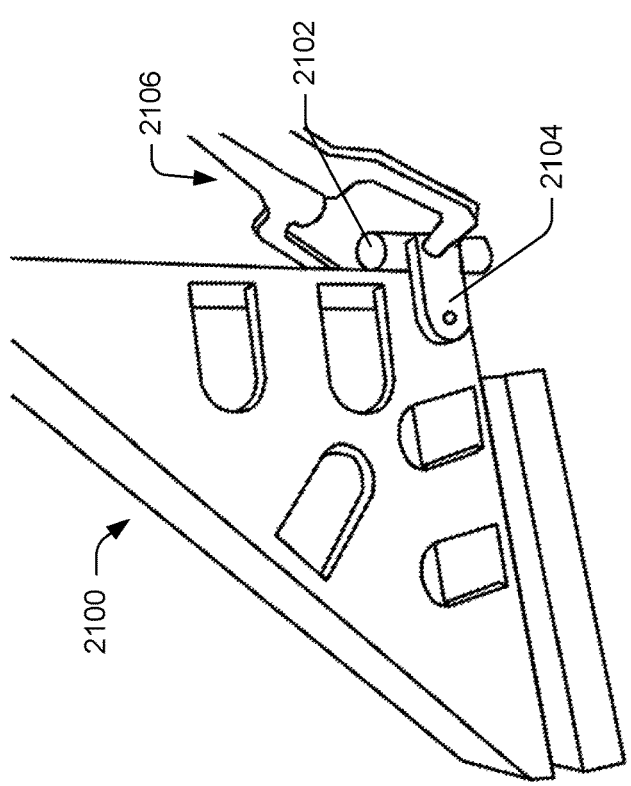

FIG. 21A depicts an example scenario in which a workpiece-alignment tool 2100 is utilized to align and hold various workpieces. In this example, a workpiece 2102 is aligned with a removable tab attachment 2104 that is connected to the workpiece-alignment tool 2100. The workpiece 2102 is held to the removable tab attachment 2104 by using a clamp 2106. In this manner, the workpiece 2102 is aligned at a point of tangency with respect to both a side of the workpiece-alignment tool 2100 and the removable tab attachment 2104.

FIG. 21B depicts an example scenario in which multiple workpiece-alignment tools 2110 and 2112 are utilized to align and hold workpieces 2114 and 2116. In this example, the workpiece-alignment tools 2110 and 2112 are aligned with one another by aligning respective side panels. The workpiece-alignment tools 2110 and 2112 are held together by using a clamp 2118. The workpieces 2114 and 2116 are aligned at an angle with respect to one another by aligning the workpiece 2114 with a side panel of the workpiece-alignment tool 2110, and aligning the workpiece 2116 with a side panel of the workpiece-alignment tool 2112.

Figure 22B:
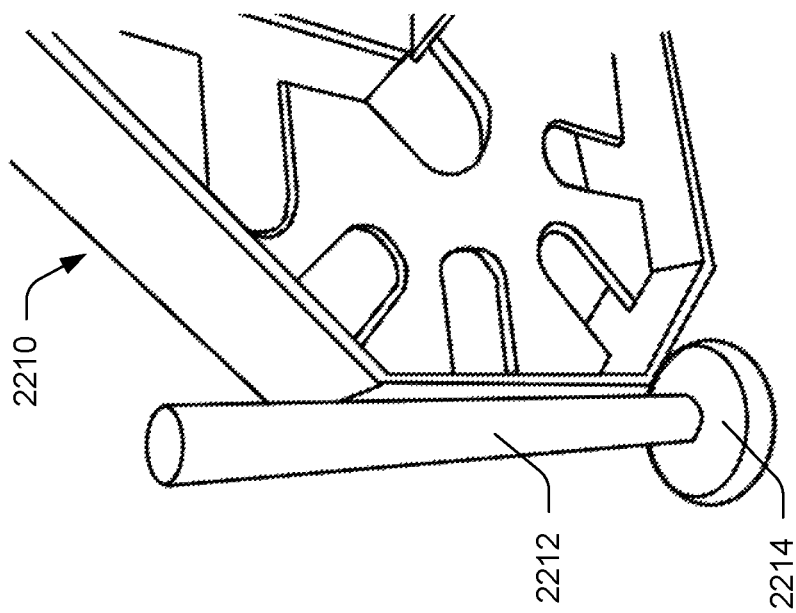
Figure 22A:
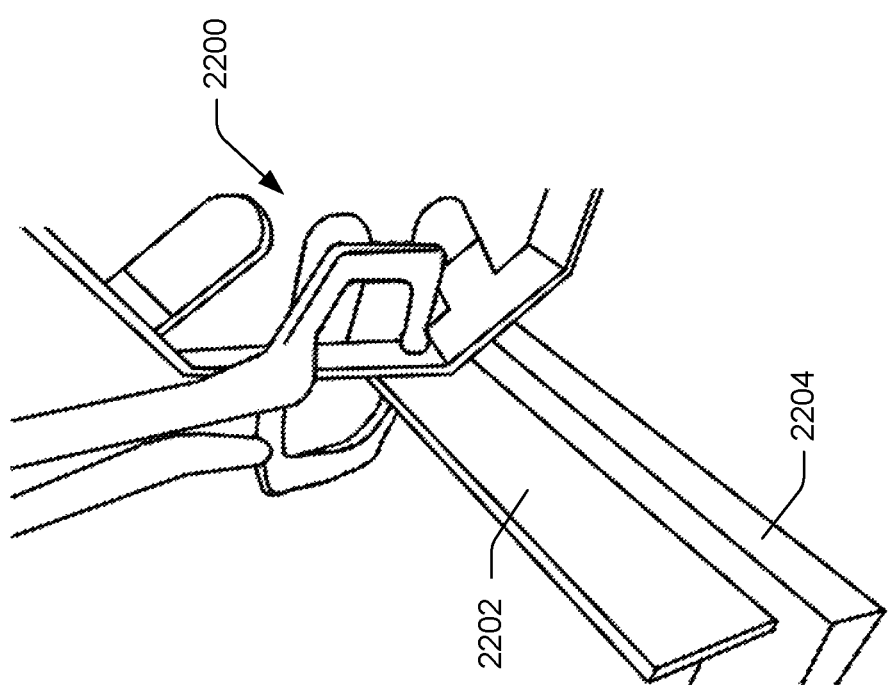

FIG. 22A depicts an example scenario in which a workpiece-alignment tool 2200 is utilized to align and hold various workpieces. In this example, two workpieces 2202 and 2204 are aligned to form a 'T' shape. However, the workpiece 2204 does not provide sufficient contact areas proximate the workpiece 2202 with which to provide an alignment via a conventional tool. The workpiece 2202 is instead aligned and held to a side of the workpiece-alignment tool 2200. While conventional tools are unable to provide alignment due to the portions of workpiece 2204 that necessarily protrude to form the 'T' shape, the accessibility cutout of the workpiece-alignment tool 2200 allows accurate alignment of the workpieces 2202 and 2204.

FIG. 22B depicts an example scenario in which a workpiece-alignment tool 2210 is utilized to align and hold various workpieces. In this example, a workpiece 2212 is aligned to be vertical. However, the workpiece 2212 is fixed to a collar 2214 that obstructs access to a bottom portion of the workpiece 2212. The workpiece 2212 is instead aligned at a vertically higher point and held to a side of the workpiece-alignment tool 2210. While conventional tools are unable to provide alignment due to the obstructing collar 2214, an access space of the workpiece-alignment tool 2210 allows accurate alignment of the workpiece 2212.

CONCLUSION

Accordingly, workpiece-alignment tools and techniques are described. The workpiece-alignment tools are usable to ensure consistent and durable alignment of various workpieces while providing access for performing attachment techniques thereon, which is not possible using conventional tools and techniques. Accessibility cutouts and access spaces may provide a user simultaneous access to points around a joint formed by objects aligned the alignment surfaces. In this way, the workpiece-alignment tool provides accessibility that allows a user to operate upon a workpiece, e.g., as by joining aligned objects together, without interfering or obstructing access to the objects. Further, cutouts provide increased access to interior surfaces of the workpiece-alignment tool, such as to increase the area available for use of clamps or other fastening devices.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A portable, workpiece-alignment tool comprising:
a first panel having an interior surface and an exterior surface connected by a plurality of side surfaces;
a second panel joined directly to the first panel and forming a first angle less than 90 degrees therewith, the second panel having an interior surface and an exterior surface connected by respective side surfaces;
a third panel joined directly to the first panel and forming a second angle greater than 90 degrees therewith, the third panel having an interior surface and an exterior surface connected by respective side surfaces;
a diaphragm connected to at least portions of the interior surfaces of the first, second, and third panels, the diaphragm including at least one cutout having an opening adjacent and bounded by one of the first or second panels and configured to permit a workpiece to be clamped to and held against an interior surface or an exterior surface of the first or second panel to which the opening of the at least one cutout opening is adjacent.

2. The portable, workpiece-alignment tool of claim 1, further comprising multiple additional panels joined either directly or indirectly to the first, second, and third panels to form an interior region within which the diaphragm is disposed, each of the multiple additional panels having respective interior and exterior surfaces, the diaphragm being connected to at least portions of the interior surfaces of each of the multiple additional panels at respective connection angles.

3. The portable, workpiece-alignment tool of claim 1, wherein the diaphragm has a master cutout having an opening that is generally unbounded by any of the panels.

4. The portable, workpiece-alignment tool of claim 1, further comprising a fourth panel joined directly to the third panel and forming a third angle greater than 90 degrees therewith, the fourth panel having an interior surface connected to the diaphragm and an exterior surface connected by respective side surfaces.

5. The portable, workpiece-alignment tool of claim 4, further comprising:
- a fifth panel joined directly to the fourth panel and forming a fourth angle greater than 90 degrees therewith, the fifth panel having an interior surface connected to the diaphragm and an exterior surface connected by respective side surfaces;
- a sixth panel joined directly to the fifth panel and forming a fifth angle greater than 90 degrees therewith, the sixth panel having an interior surface connected to the diaphragm and an exterior surface connected by respective side surfaces;
- a seventh panel joined directly to the sixth panel and forming a sixth angle less than 90 degrees therewith, the seventh panel having an interior surface connected to the diaphragm and an exterior surface connected by respective side surfaces.

6. The portable, workpiece-alignment tool of claim 5, wherein the first and sixth angles are each about 45 degrees, and the second, third, fourth, and fifth angles are each about 135 degrees.

7. The portable, workpiece-alignment tool of claim 1, wherein the first angle is about 45 degrees and the second angle is about 135 degrees.

8. A portable, workpiece-alignment tool comprising:
- a diaphragm having a surface defining a reference plane, the diaphragm including and partially bounding an opening that is generally unbounded by any panels extending perpendicular to the reference plane;
- a first panel connected to the diaphragm, the first panel having an interior surface and an exterior surface aligned with a first plane that is generally perpendicular to the reference plane, the first plane passing through the opening; and
- a second panel connected to the diaphragm, the second panel having an interior surface and an exterior surface aligned with a second plane that is generally perpendicular to the reference plane, the second plane passing through the opening, the first and second planes forming an angle.

9. The portable, workpiece-alignment tool of claim 8, wherein the first, second, and reference planes are orthogonal to one another.

10. The portable, workpiece-alignment tool of claim 8, wherein the diaphragm has a cutout extending from the intersection of the first and second planes.

11. The portable, workpiece-alignment tool of claim 8, wherein the first and second planes form an angle of generally 90-degrees.

12. The portable, workpiece-alignment tool of claim 8, further comprising a third panel connected to the second panel and forming an angle therewith, and wherein the angle is less than 90-degrees.

13. The portable, workpiece-alignment tool of claim 8, further comprising a third panel connected to the second panel and forming an angle therewith, and wherein the angle is greater than 90-degrees.

14. The portable, workpiece-alignment tool of claim 8, further comprising a third panel joined directly to the first panel, the third panel having an interior surface and an exterior surface connected by respective side surfaces.

15. A portable, workpiece-alignment tool comprising:
- a first panel having an interior surface and an exterior surface connected by a plurality of side surfaces;
- a second panel having an interior surface and an exterior surface connected by respective side surfaces;
- a first diaphragm connected to at least portions of the interior surface of the first panel;
- a second diaphragm connected to at least portions of the interior surface of the second panel,
- a hinge connecting the first diaphragm to the second diaphragm such that the first panel and the second panel do not contact one another, and such that the first panel and the second panel are configurable to form a first configuration and a second configuration, the first panel and the second panel form an angle greater than 45 degrees in the first configuration, and the first panel and the second panel are parallel in the second configuration.

16. The portable, workpiece-alignment tool of claim 15, wherein the hinge is movable to alter the angle.

17. The portable, workpiece-alignment tool of claim 16, wherein the hinge is offset a distance from a point forming the angle.

18. The portable, workpiece-alignment tool of claim 17, wherein the first diaphragm and the second diaphragm each have a cutout extending from the point forming the angle.

19. The portable, workpiece-alignment tool of claim 16, further comprising a hinge constraint to restrict movement of the hinge.

20. The portable, workpiece-alignment tool of claim 19, wherein the first diaphragm includes a first slot, the second diaphragm includes a second slot, and the hinge constraint is disposed within the first slot and the second slot.

* * * * *